(12) United States Patent
Usami et al.

(10) Patent No.: US 7,193,956 B2
(45) Date of Patent: Mar. 20, 2007

(54) ELECTRON BEAM IRRADIATION APPARATUS, ELECTRON BEAM IRRADIATION METHOD, AND APPARATUS FOR AND METHOD OF MANUFACTURING DISC-SHAPED OBJECT

(75) Inventors: Mamoru Usami, Tokyo (JP); Kazushi Tanaka, Tokyo (JP); Kenji Yoneyama, Tokyo (JP); Yukio Kaneko, Tokyo (JP); Takeshi Umega, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/528,518

(22) PCT Filed: Sep. 18, 2003

(86) PCT No.: PCT/JP03/11890

§ 371 (c)(1),
(2), (4) Date: Mar. 18, 2005

(87) PCT Pub. No.: WO2004/027520

PCT Pub. Date: Apr. 1, 2004

(65) Prior Publication Data

US 2006/0098550 A1 May 11, 2006

(30) Foreign Application Priority Data

Sep. 19, 2002 (JP) ............................. 2002-274120
Sep. 19, 2002 (JP) ............................. 2002-274121

(51) Int. Cl.
*G11B 7/00* (2006.01)

(52) U.S. Cl. ...................................... 369/117; 369/143

(58) Field of Classification Search ................ 369/117, 369/143
See application file for complete search history.

(56) References Cited

U.S. PATENT DOCUMENTS 6,614,037 B2 * 9/2003 Naito ...................... 250/492.3

(Continued)

FOREIGN PATENT DOCUMENTS

JP        2001-202663    * 7/2001

(Continued)

OTHER PUBLICATIONS

Patent Abstracts of Japan for JP2002-163845 published on Jul. 6, 2002.

(Continued)

*Primary Examiner*—Wayne Young
*Assistant Examiner*—Mineva Rivero
(74) *Attorney, Agent, or Firm*—Darby & Darby

(57) ABSTRACT

An electron beam irradiation apparatus and method capable of easily curing at least part of a surface layer and/or a resin layer composed of materials that are hard to be cured by irradiation of ultraviolet rays. A disc-shaped object manufacturing apparatus and method capable of efficiently forming, on the disc-shaped object, at least part of a surface layer and/or a resin layer such as light transmitting layer, etc, thereunder. An electron beam irradiation apparatus comprises a rotary driving unit for rotationally driving an object, a shield container rotatably accommodating the object, and an electron beam irradiation unit provided in the shield container so that the surface of the object is irradiated with electron beams from an irradiation window thereof, wherein the surface of the object is irritated with the electron beams during its rotation from the irradiation window of the election beam irradiation unit. The surface of the on-rotating object can be thereby irradiated with the electron beams having larger energy than the ultraviolet rays have.

36 Claims, 19 Drawing Sheets

U.S. PATENT DOCUMENTS 6,686,597 B2 * 2/2004 Kumasaka et al. ...... 250/492.2
2001/0028456 A1 * 10/2001 Nishi .......................... 356/400

FOREIGN PATENT DOCUMENTS

JP 2002-163845 * 6/2002

OTHER PUBLICATIONS

Patent Abstracts of Japan for JP2002-042384 published on Feb. 8, 2002.
Patent Abstracts of Japan for JP2001-202663 published on Jul. 27, 2001.
Patent Abstracts of Japan for JP11-288530 published on Oct. 1, 1999.
Patent Abstracts of Japan for JP04-019839 published on Jan. 23, 1992.
Patent Abstracts of Japan for JP11-162015 published on Jun. 18, 1999.
Patent Abstracts of Japan for JP07-292470 published on Nov. 7, 1995.
Patent Abstracts of Japan for JP2000-064042 published on Feb. 29, 2000.
International Search Report for PCT/JP03/11890 mailed Jan. 13, 2004.

* cited by examiner

US 7,193,956 B2

ELECTRON BEAM IRRADIATION APPARATUS, ELECTRON BEAM IRRADIATION METHOD, AND APPARATUS FOR AND METHOD OF MANUFACTURING DISC-SHAPED OBJECT

CROSS-REFERENCE TO PRIOR APPLICATION

This is a U.S. National Phase application under 35 U.S.C. §371 of International Patent Application No., PCT/JP2003/011890, filed Sep. 18, 2003, and claims the benefit of Japanese Patent Application Nos. 2002-274120, filed Sep. 19, 2002 and 2002-274121, filed Sep. 19, 2002, all of which are incorporated by reference herein. The International Application was published in Japanese on Apr. 1, 2004 as WO 2004/027520 A1 under PCT Article 21(2).

TECHNICAL FIELD

The present invention relates to an electron beam irradiation apparatus and electron beam irradiation method for irradiating electron beams and to an apparatus for and a method of manufacturing a disc-shaped object.

BACKGROUND ARTS

Optical discs such as a CD (Compact Disc), a DVD (Digital versatile Disc), etc. have hitherto been utilized as optical information recording mediums. Over the recent years, however, there has been a progress of developing a blue semiconductor laser of which an oscillation wavelength is on the order of 400 nm. The development of a next generation high-density optical disc such as a high-density DVD, etc. capable of recording with a higher density than the general DVD, is conducted by use of this type of blue semiconductor laser.

FIG. 12 shows an example of a now-thinkable layer structure of this type of next generation high-density optical disc.

This high-density optical disc is structured such that a recording layer 91 for recording information, a light transmitting layer 92 that transmits laser beams for recording and reproducing so that the laser beams get incident on the recording layer 91 and a lubrication layer 93 taking contact with a member on the side of an optical pickup into consideration, are stacked in this sequence on a substrate 90 composed of a resin material such as polycarbonate, etc.

The light transmitting layer 92 and the lubrication layer 93 are, when formed, irradiated with ultraviolet rays after being coated for curing. When especially the lubrication layer, etc. is formed of a material such as silicone compound, fluorine compound, etc. that exhibit radical polymerization double-bond, however, there might be a case in which a characteristic as the lubrication layer deteriorates if a reaction initiator is added thereto. In such a case, if the reaction initiator is not added, the curing is hard to be done by the irradiation of the ultraviolet rays, and the lubrication layer exhibiting having a sufficient quality can not be formed. (Refer to Japanese Patent Laid-Open Application Publication No. 4-019839, Japanese Patent Laid-Open Application Publication No. 11-162015, Japanese Patent Laid-Open Application Publication No. 7-292470, Japanese Patent Laid-Open Application Publication No. 2000-64042).

DISCLOSURE OF THE INVENTION

It is an object of the present invention to provide, in view of the aforementioned problems inherent in the prior arts, an electron beam irradiation apparatus and an electron beam irradiation method capable of easily curing at least part of a surface layer and/or a resin layer such as light transmitting layer, etc. thereunder, each composed of materials that are hard to be cured by irradiation of ultraviolet rays.

It is another object of the present invention to provide a disc-shaped object manufacturing apparatus and a disc-shaped object manufacturing method capable of efficiently forming, on a disc-shaped object, at least part of a surface layer and/or a resin layer such as light transmitting layer, etc. thereunder, each composed of materials that are hard to be cured by the irradiation of ultraviolet rays.

It is still another object of the present invention to provide an electron beam irradiation apparatus and an electron beam irradiation method capable of easily curing at least part of a surface layer and/or a resin layer such as light transmitting layer, etc. thereunder, each composed of materials that are hard to be cured by irradiation of ultraviolet rays, and capable of easily executing switchover to the irradiation and non-irradiation of the electron beams.

It is a further object of the present invention to provide a disc-shaped object manufacturing apparatus and a disc-shaped object manufacturing method capable of easily executing the switchover to the irradiation and non-irradiation of the electron beams, and capable of efficiently forming, on a disc-shaped object, at least part of a surface layer and/or a resin layer such as light transmitting layer, etc. thereunder, each composed of materials that are hard to be cured by the irradiation of ultraviolet rays.

To accomplish the above objects, a first electron beam irradiation apparatus according to the present invention comprises a rotary driving unit for rotationally driving an object to be rotated, a shield container for rotatably accommodating the object, and an electron beam irradiation unit provided in the shield container so that the surface of the object is irradiated with electron beams from an irradiation window thereof, wherein the surface of the object is irradiated with the electron beams during its rotation from the irradiation window of the electron beam irradiation unit.

According to the first electron beam irradiation apparatus, the surface of the on-rotating object is irradiated with the electron beams and can be therefore efficiently irradiated with the electron beams having the larger energy than the ultraviolet rays have. It is therefore possible to easily cure at least part of the surface layer and/or the resin layer such as the light transmitting layer, etc. thereunder, composed of the materials that are hard to be cured by the irradiation of, e.g., the ultraviolet rays.

Note that the light transmitting layer involves using a resin as a main component and corresponds to the resin layer according to the present invention. The resin layer may also be multi-layered, wherein, e.g., a hard coat layer is may be provided on the surface side of the layer composed mainly of the resin, and these layers are stacked to form the layer of which the main component is the resin. Further, the surface layer may be formed of a material, e.g., a lubricating layer forming material and a material exhibiting water repellency and oil repellency, which are different from the layer of which the main component is the resin. Moreover, such a layer may also be either single-layered or multi-layered. The lubricating layer is a layer of one mode included in a definition of the surface layer according to the present invention. In the following discussion, the terms "resin layer" and "lubricating layer" are employed as defined in the connotation given above.

In the first electron beam irradiation apparatus, it is preferable that the electron beam irradiation unit emits the electron beams under a low acceleration voltage. It is preferable that the acceleration voltage thereof is particularly 20 kV through 100 kV. With this contrivance, the electron beam energy is efficiently applied over a thin range, e.g., the lubricating layer from the surface, and the electron beams do not affect a substrate, etc. existing thereunder. Moreover, it is preferable that an interior of the shield container is set in an atmosphere of an inert gas such a nitrogen gas, an argon gas, a mixture of these gasses, etc., and the shield container is provided with a gas introduction port and a gas discharge port from which the inert gas flows in the vicinity of the irradiation window. The irradiation window can be cooled off owing to a flow of this inert gas.

In this case, a temperature sensor is provided in the vicinity of the irradiation window, and a flow rate of the inert gas is adjusted based on a temperature measured by the temperature sensor, whereby the vicinity of the irradiation window can be controlled at a temperature equal to or lower than a fixed temperature.

Further, it is preferable that an oxygen concentration meter for measuring an oxygen concentration within the shield container, is provided. This oxygen concentration meter enables confirmation that the interior of the shield container is kept with a fixed or lower oxygen concentration. For example, an inhibition of radical reaction due to the oxygen in the vicinity of the irradiation surface of the object to be irradiated with the electron beams, is hard to occur, and preferable curing reaction can be ensured.

Moreover, it is preferable that a vacuumizing device for depressurizing the interior of the shield container is provided. This vacuumizing device enables the irradiation of the electron beams to be conducted within the shield container depressurized down to a predetermined pressure, and also enables the interior of the shield container to be easily and efficiently replaced with the inert gas atmosphere.

Further, the object has a disc shape, and an area extending in at least one radial direction of the surface of the object can be irradiated with the electron beams. Therefore, the on-rotating disc-shaped rotated object as a whole can be easily efficiently irradiated the electron beams simply by disposing the electron beam irradiation unit in one radial direction. Note that a plurality of electron beam irradiation units may also be arranged to effect the irradiation of the electron beams from a plurality of radial positions.

Further, the object may have a disc shape, the electron beam irradiation unit may include a plurality of electron beam irradiation tubes, and each of the electron beam irradiation tubes may irradiate each of a plurality of areas on the surface with the electron beams. In this case, the plurality of electron beam irradiation tubes may be arranged on the same straight line in one radial direction, or at least one of the electron beam irradiation tubes may be disposed in a position deviating from the same straight line in one radial direction, or the whole electron beam irradiation tubes may be so arranged as not to exist on the same straight line in one radial direction.

Moreover, it is preferable that a shutter member is disposed between the irradiation window and the surface of the object, and a shutter driving mechanism moves the shutter member between an opening position of permitting transmission of the electron beams emitted from the irradiation window and a closing position of blocking the electron beams, thus controlling switchover of the irradiation and non-irradiation of the electron beams upon the surface of the object. With this contrivance, the control of the irradiation of the electron beams can be easily executed.

In this case, it is preferable that the switchover is conducted so that a quantity of emission of the electron beams is set large when the shutter member is in the opening position and set small when the shutter member is in the closing position.

It is also preferable that the shield container is openable and closable and is composed of a metallic material such as steel or stainless steel, and has a shielding structure for shielding the electron beams emitted from the irradiation window. This structure makes it possible to shield the electron beams and secondary X-rays and to leak none of the electron beams and the secondary X-rays to the outside, therefore preferable in terms of taking a security measure against exposure. Note that an air-tightly closed structure for air-tightly closing the shield container be, it is preferable, provided in the vicinity of the shield structure. Owing to this contrivance, a material of an O-ring, etc. structuring the air-tightly closed structure is shielded from the electron beams and does not suffer material deterioration due to the irradiation of the electron beams.

A second electron beam irradiation apparatus according to the present invention comprises a rotary driving unit for rotationally driving an object to be rotated, a shield container for rotatably accommodating the object, an electron beam irradiation unit provided in the shield container so that the surface of the object is irradiated with electron beams from an irradiation window thereof, a shutter member disposed between the irradiation window and the surface of the object and movable between an opening position of permitting transmission of the electron beams emitted from the irradiation window and a closing position of blocking the electron beams, and a shutter driving mechanism for moving the shutter member so as to effect switchover to the irradiation and non-irradiation of the electron beams during a rotation of the object, wherein the object has a disc shape, and an area, extending in one radial direction, on the surface is irradiated with the electron beams from the irradiation window.

According to the second electron beam irradiation apparatus, the surface of the on-rotating object is irradiated with the electron beams and can be therefore irradiated efficiently with the electron beams having the larger energy than the ultraviolet rays have. Hence, it is feasible to easily cure, for example, a layer (a lubricating layer), etc. exhibiting lubricity and composed of a material that is hard to be cured by the irradiation of the ultraviolet rays. Moreover, it is possible to easily execute the switchover control of the irradiation and the non-irradiation of the electron beams by use of the shutter member, and there is no necessity of ON/OFF-controlling the power source of the electron beam irradiation unit. Accordingly, a period of startup time of the electron beam irradiation unit is not required, and this is efficient when repeating the irradiation of the electron beams. Still further, the object has the disc shape, and the area extending in the radial direction of the surface is irradiated with the electron beams from the irradiation window. Hence, the on-rotating disc-shaped rotated object can be easily efficiently irradiated with the electron beams simply by disposing the electron beam irradiation unit in one radial direction.

In the second electron beam irradiation apparatus, it is preferable that the electron beam irradiation unit includes a plurality of electron beam irradiation tubes disposed in the radial direction. Note that the radial direction in this case may be either a direction extending radially from the center of the rotation of the object or a direction extending toward an outer periphery of the object from a point eccentric from the center of the rotation of the object. The plurality of electron beam irradiation tubes can be so arranged as to substantially uniformize a distribution of irradiation beam intensities of the electron beams in the radial direction. In this case, it is preferable that a period of electron beam irradiation time is controlled corresponding to a radial position of the object so as to substantially equalize an integrated irradiation dose of the electron beam irradiation in the radial direction. With this contrivance, it is feasible to correct and uniformize an ununiform distribution of the integrated irradiation dose of the electron beam irradiation in the radial direction, which is caused by a difference in speed between the radial positions on the surface of the object.

For instance, the shutter member is constructed to start, when opened, opening in an outer peripheral position and to gradually open toward an inner peripheral position on the surface of the object, and, with this construction, the irradiation time can be set long on the outer peripheral side exhibiting a high peripheral speed and set short on the inner peripheral side exhibiting a low peripheral speed. It is therefore possible to correct and substantially uniformize the ununiform distribution of the integrated irradiation dose of the electron beam irradiation in the radial direction. Incidentally, a preferable construction in this case is that the shutter member is closed as this shutter member moves in the direction opposite to the opening direction. Further, the irradiation time according to the present invention represents a period of time for which the object is kept in a state of being actually irradiated with the electron beams.

Moreover, for example, an aperture is formed extending in the radial direction, the switchover to the irradiation and the non-irradiation of the electron beams is performed by opening and closing the aperture through a movement of the shutter member, and the electron beam irradiation time is controlled corresponding to the radial position of the object, depending on a relative position between the shutter member and the aperture and on a moving speed of the shutter member, thereby making it possible to set the irradiation time long on the outer peripheral side exhibiting the high peripheral speed and short on the inner peripheral side exhibiting the low peripheral speed. It is therefore feasible to correct and substantially uniformize the ununiform distribution of the integrated irradiation dose of the electron beam irradiation described above in the radial direction.

Moreover, the plurality of electron beam irradiation tubes can be arranged to obtain such a distribution that an irradiation beam intensity of the electron beams is high on the outer peripheral side but low on the inner peripheral side in the radial direction. With this arrangement, the intensity of the irradiation beams is set high on the outer peripheral side exhibiting the high peripheral speed but low on the inner peripheral side exhibiting the low peripheral speed on the object that is rotated at a fixed rotating speed. Therefore, it is possible to correct and substantially uniformize the ununiform distribution of the integrated irradiation dose of the electron beam irradiation in the radial direction that is caused by the difference in speed between the radial positions on the surface of the object.

In this case, the shutter member is constructed to open and close at a comparatively higher speed than a rotating speed of the object, thereby making ignorable the difference in irradiation time when opening and closing the shutter member.

As described above, the irradiation of the electron beams can be effected so as to attain substantially the uniform distribution of the integrated irradiation dose of the electron beam irradiation in the radial direction of the object, and the energy of the electron beams is applied substantially uniformly over the entire irradiated surface of the object, and hence, for instance, the resin layer can be instantaneously efficiently cured.

Furthermore, the second electron beam irradiation apparatus can be constructed so that an aperture is formed extending in the radial direction, and the switchover to the irradiation and the non-irradiation of the electron beams is performed by opening and closing the aperture through a movement of the shutter member. In this case, it is preferable that the aperture is formed in at least one of the shutter member and a different member provided between the irradiation window and the surface of the object.

A first electron beam irradiation method according to the present invention comprises rotationally driving an object to be rotated accommodated in a shield container that can be air-tightly closed, and irradiating the surface of the on-rotating object with the electron beams from an irradiation window of an electron beam irradiation unit.

According to the first electron beam irradiation method, the surface of the on-rotating object is irradiated with the electron beams, and hence the object can be efficiently irradiated with the electron beams having the larger energy than the ultraviolet rays have. Consequently, for instance, the lubricating layer, etc. composed of the material that is hard to be cured by the irradiation of the ultraviolet rays, can be easily cured.

In the electron beam irradiation method, it is preferable that the electron beams irradiation unit emits the electron beams of which an acceleration voltage is 20 kV through 100 kV. Owing to this contrivance, especially the energy of the electron beams is efficiently applied over a thin range, e.g., the lubricating layer from the surface, and the electron beams do not affect the substrate, etc. existing thereunder.

Moreover, an interior of the shield container is depressurized and is thereafter replaced with an inert gas atmosphere by introducing an inert gas, whereby the interior of the shield container can be easily efficiently set in the inert gas atmosphere.

Further, it is preferable that a flow rate of the inert gas is controlled while measuring an oxygen concentration within the shield container. Still further, it is preferable that the inert gas is flowed through the vicinity of the irradiation window toward a gas discharge port from a gas introduction port, thereby cooling off the vicinity of the irradiation window.

Yet further, it is preferable that a flow rate of the inert gas is adjusted based on a temperature measured by a temperature sensor provided in the vicinity of the irradiation window, thereby controlling a cooling temperature.

Moreover, it is preferable that the object has a disc shape, and an area, extending in at least one radial direction, on the surface is irradiated with the electron beams. Furthermore, it is preferable that the object has the disc shape, and a plurality of electron beam irradiation tubes of the electron beam irradiation unit irradiate each of a plurality of areas with the electron beams.

Further, it is preferable that a shutter member disposed between the irradiation window and the surface of the object is moved between an opening position of permitting transmission of the electron beams emitted from the irradiation window and a closing position of blocking the electron beams, thus controlling switchover of the irradiation and non-irradiation of the electron beams upon the surface of the object. With this contrivance, the control of the irradiation of the electron beams can be easily executed, and there is no necessity of ON/OFF-controlling the power source of the electron beam irradiation unit.

In this case, it is preferable that the switchover is conducted so that a quantity of emission of the electron beams is set large when the shutter member is in the opening position and set small when the shutter member is in the closing position.

A second electron beam irradiation method according to the present invention comprises a step of rotationally driving an object to be rotated accommodated in a shield container that can be air-tightly closed, a step of irradiating the surface of the on-rotating object with the electron beams from an irradiation window by moving a shutter member provided between the surface of the object and the irradiation window of an electron beam irradiation unit, and a step of stopping the irradiation of the electron beams by blocking the electron beams in a way that moves the shutter member after the irradiation of the electron beams for a predetermined period of time.

According to the second electron beam irradiation method, the surface of the on-rotating object is irradiated with the electron beams and can be therefore efficiently irradiated with the electron beams having the larger energy than the ultraviolet rays have. Consequently, for instance, the lubricating layer composed of the material that is hard to be cured by the irradiation of the ultraviolet rays, can be easily cured. Moreover, it is possible to easily execute the switchover control of the irradiation and the non-irradiation of the electron beams by use of the shutter member, and there is no necessity of ON/OFF-controlling the power source of the electron beam irradiation unit. Accordingly, a period of startup time of the electron beam irradiation unit is not required, and this is efficient when repeating the irradiation of the electron beams.

In the second electron beam irradiation method, it is preferable that the electron beams irradiation unit has an acceleration voltage ranging from 20 kV to 100 kV. Owing to this contrivance, especially the energy of the electron beams is efficiently applied over the thin range, e.g., the lubricating layer from the surface, and the electron beams do not affect the substrate, etc. existing thereunder.

Further, an interior of the shield container is depressurized and is thereafter replaced with an inert gas atmosphere by introducing an inert gas, whereby the interior of the shield container can be easily efficiently set in the inert gas atmosphere.

Further, it is preferable that the inert gas is introduced while measuring an oxygen concentration within the shield container. Still further, it is preferable that the inert gas is flowed through the vicinity of the irradiation window toward a gas discharge port from a gas introduction port, thereby cooling off the vicinity of the irradiation window.

Yet further, it is preferable that a flow rate of the inert gas is adjusted based on a temperature measured by a temperature sensor provided in the vicinity of the irradiation window, thereby controlling a cooling temperature. Moreover, it is preferable that the object has a disc shape, and an area, extending in the radial direction, on the surface is irradiated with the electron beams from the irradiation window. Note that a plurality of electron beam irradiation units may also be disposed and may effect the irradiation of the electron beams in a plurality of positions in the radial direction.

In this case, it is preferable that the irradiation of the electron beams can be effected by the plurality of electron beam irradiation tubes, serving as the electron beam irradiation unit, arranged in the radial direction of the surface.

Further, it is preferable that the plurality of electron beam irradiation tubes are so arranged as to substantially uniformize a distribution of irradiation beam intensities of the electron beams in the radial direction, and a period of electron beam irradiation time is controlled corresponding to a radial position of the object so as to substantially uniformize a distribution of an integrated irradiation dose of the electron beam irradiation in the radial direction.

With this contrivance, it is feasible to correct and substantially uniformize an ununiform distribution of the integrated irradiation dose of the electron beam irradiation in the radial direction, which is caused by a difference in speed between the radial positions on the surface of the object. For instance, the shutter member starts, when opened, opening in an outer peripheral position and gradually opens toward an inner peripheral position on the surface of the object, whereby the irradiation time can be set long on the outer peripheral side exhibiting a high peripheral speed and set short on the inner peripheral side exhibiting a low peripheral speed by controlling the irradiation time in the way described above. It is therefore possible to correct and substantially uniformize the ununiform distribution of the integrated irradiation dose of the electron beam irradiation in the radial direction. Incidentally, in this case, it is preferable that the shutter member is closed as this shutter member moves in the direction opposite to the opening direction.

Moreover, the plurality of electron beam irradiation tubes are arranged to obtain such a distribution that an irradiation beam intensity of the electron beams is high on the outer peripheral side but low on the inner peripheral side in the radial direction. With this arrangement, the intensity of the irradiation beams is set high on the outer peripheral side exhibiting the high peripheral speed but low on the inner peripheral side exhibiting the low peripheral speed on the object that is rotated at a fixed rotating speed. Therefore, it is possible to correct and substantially uniformize the ununiform distribution of the integrated irradiation dose of the electron beam irradiation in the radial direction that is caused by the difference in speed between the radial positions on the surface of the object.

In this case, the shutter member is constructed to open and close at a comparatively higher speed than a rotating speed of the object, thereby making ignorable the difference in irradiation time when opening and closing the shutter member.

As described above, the irradiation of the electron beams can be effected so as to attain substantially the uniform distribution of the integrated irradiation dose of the electron beam irradiation in the radial direction of the object, and the energy of the electron beams is applied uniformly over the entire irradiated surface of the object, and hence, for instance, the lubricating layer can be instantaneously efficiently cured.

A first apparatus for manufacturing a disc-shaped object according to the present invention is characterized by comprising the first or second electron beam irradiation apparatus described above, wherein a resin layer and/or a layer exhibiting lubricity formed on the object serving as a disc-shaped object is cured by the irradiation of the electron beams.

According to the first apparatus for manufacturing the disc-shaped object, the on-rotating disc-shaped object is irradiated with the electron beams and can be therefore efficiently irradiated with the electron beams having the larger energy than the ultraviolet rays have. Consequently, the resin layer and/or the lubricating layer composed of the material that is hard to be cured by the irradiation of the ultraviolet rays, can be easily cured and can be efficiently formed on the disc-shaped object.

Moreover, it is possible to easily execute the switchover control of the irradiation and the non-irradiation of the electron beams by use of the shutter member, and there is no necessity of ON/OFF-controlling the power source of the electron beam irradiation unit. Accordingly, the startup time of the electron beam irradiation unit is not required, and the irradiation of the electron beams can be efficiently repeated upon a multiplicity of disc-shaped objects in order to form the lubricating layers, thereby improving the productivity.

Further, the irradiation of the electron beams is effected so as to attain substantially the uniform distribution of the integrated irradiation dose of the electron beam irradiation in the radial direction of the disc-shaped object, and the energy of the electron beams can be thereby applied uniformly over the entire irradiated surface of the disc-shaped object, and hence the lubricating layer, etc. can be instantaneously efficiently cured.

A first method of manufacturing a disc-shaped object according to the present invention is characterized by involving the use of the aforementioned electron beam irradiation apparatus or the aforementioned electron beam irradiation method, wherein a resin layer and/or a lubricating layer formed on the object serving as a disc-shaped object is cured by the irradiation of the electron beams.

According to the first method of manufacturing the disc-shaped object, the on-rotating disc-shaped object is irradiated with the electron beams and can be therefore efficiently irradiated with the electron beams having the larger energy than the ultraviolet rays have. Consequently, the resin layer, the lubricating layer, etc. composed of the material that is hard to be cured by the irradiation of the ultraviolet rays, can be easily cured and can be efficiently formed on the disc-shaped object.

Moreover, it is possible to easily execute the switchover control of the irradiation and the non-irradiation of the electron beams by use of the shutter member, and there is no necessity of ON/OFF-controlling the power source of the electron beam irradiation unit. Accordingly, the startup time of the electron beam irradiation unit is not required, and the irradiation of the electron beams can be efficiently repeated upon a multiplicity of disc-shaped objects in order to form the resin layers, etc., thereby improving the productivity.

Further, the irradiation of the electron beams is effected so as to attain substantially the uniform distribution of the integrated irradiation dose of the electron beam irradiation in the radial direction of the disc-shaped object, and the energy of the electron beams can be thereby applied uniformly over the entire irradiated surface of the disc-shaped object, and hence the lubricating layer, etc. can be instantaneously efficiently cured.

In the method of manufacturing the disc-shaped object, the electron beams having an acceleration voltage ranging from 20 kV to 100 kV is employed, whereby the energy of the electron beams is efficiently applied to the resin layer over the thin range from the surface, and the electron beams do not affect the substrate, etc. existing thereunder.

Note that the disc-shaped object manufacturing method preferably further comprises a step of forming a lubricating layer on the pre-irradiation disc-shaped object, which is executed before the electron beam irradiating step, whereby the lubricating layer can be cured by the irradiation of the electron beams.

A second apparatus for manufacturing a disc-shaped object according to the present invention comprises: an air-tightly closable chamber including an electron beam irradiation apparatus having a first rotational unit provided in an openable/closable shield container and accommodating a disc-shaped object, and an electron beam irradiation unit irradiating the surface of the disc-shaped object with electron beams from its irradiation window, and an exchange chamber having a second rotational unit capable of accommodating the disc-shaped object and air-tightly closable and openable/closable independently of the shield container; and a rotary unit for exchanging the first rotational unit in the shield container and the second rotational unit in the exchange chamber with each other by rotating the first rotational unit and the second rotational unit.

According to the second apparatus for manufacturing the disc-shaped object, the disc-shaped object is irradiated with the electron beams having the larger energy than the ultraviolet rays have, and hence the lubricating layer, etc. composed of the material that is hard to be cured by the irradiation of the ultraviolet rays, can be easily cured. Moreover, the first rotational unit and the second rotational unit are exchanged with each other by rotating these two rotational units, thereby ejecting the post-irradiation disc-shaped object and supplying the pre-irradiation disc-shaped object. These two disc-shaped objects are thus efficiently exchanged with each other, and consequently the productivity is improved.

A third apparatus for manufacturing a disc-shaped object according to the present invention comprises: an air-tightly closable chamber including an electron beam irradiation apparatus having a first rotational unit provided in an openable/closable shield container and accommodating and rotationally driving a disc-shaped object and an electron beam irradiation unit irradiating the surface of the on-rotating disc-shaped object with electron beams from its irradiation window, and an exchange chamber having a second rotational unit capable of accommodating the disc-shaped object and air-tightly closable and openable/closable independently of the shield container; and a rotary unit for exchanging the first rotational unit in the shield container and the second rotational unit in the exchange chamber with each other by rotating the first rotational unit and the second rotational unit.

According to the third apparatus for manufacturing the disc-shaped object, the on-rotating disc-shaped object is irradiated with the electron beams and can be therefore irradiated with the electron beams having the larger energy than the ultraviolet rays have, and hence, e.g., the lubricating layer, etc. composed of the material that is hard to be cured by the irradiation of the ultraviolet rays, can be easily cured. Moreover, the first rotational unit and the second rotational unit are exchanged with each other by rotating these two rotational units, thereby ejecting the post-irradiation disc-shaped object and supplying the pre-irradiation disc-shaped object. These two disc-shaped objects are thus efficiently exchanged with each other, and consequently the productivity is improved.

In the second and third apparatuses for manufacturing a disc-shaped object, it is preferable that the electron beam irradiation unit emits the electron beams of which an acceleration voltage is 20 kV through 100 kV. Owing to this contrivance, especially the energy of the electron beams is efficiently applied to, e.g., the lubricating layer over the thin range from the surface, and the electron beams do not affect the substrate, etc. existing thereunder.

Further, it is preferable that the surface of the disc-shaped object moving into the shield container by rotating the second rotational unit in the exchange chamber, is irradiated with the electron beams emitted from the electron beam irradiation unit, and the first rotational unit, accommodating the disc-shaped object after being irradiated with the electron beams, in the shield container is rotated and thus transferred into the exchange chamber.

Yet further, it is preferable that the shield container includes a fixed unit forming a first air-tightly closed space in cooperation with the first or second rotational unit and provided with the electron beam irradiation unit, the exchange chamber includes a third rotational unit forming a second air-tightly closed space in cooperation with the second or first rotational unit and capable of attaching and detaching the disc-shaped object, in a state where the chamber is air-tightly closed, the first rotational unit moves to and from the fixed unit, and the second rotational unit moves to and from the third rotational unit, thereby exchanging the disc-shaped object, the third rotational unit opens the second air-tightly closed space and rotates while holding the disc-shaped object, thereby ejecting the post-irradiation disc-shaped object, and a different fourth rotational unit rotates toward the second rotational unit and exchanges the pre-irradiation disc shaped object in a way that supplies the disc-shaped object to the second rotational unit.

Still further, it is preferable that the electron beam irradiation unit irradiates the electron beams within the first air-tightly closed space during the exchange of the disc-shaped object by the third and fourth rotational units.

Moreover, it is preferable that a shutter member disposed between the irradiation window of the electron beam irradiation unit and the surface of the disc-shaped object and is moved by a shutter driving mechanism between an opening position of permitting transmission of the electron beams emitted from the irradiation window and a closing position of blocking the electron beams, thereby controlling switchover to the irradiation and non-irradiation of the electron beams upon the surface of the disc-shaped object.

Additionally, it is preferable that an interior of the exchange chamber is depressurized and is thereafter replaced with an inert gas atmosphere. It is also preferable that the inert gas flows in the vicinity of the irradiation window, thereby cooling off the irradiation window.

Furthermore, it is preferable that the shield container is composed of a metallic material, and a shielding portion for shielding the electron beams is provided at an abutting portion between the first rotational unit and the fixed unit.

A second method of manufacturing a disc-shaped object according to the present invention comprising a step of irradiating the surface of a disc-shaped object accommodated in a rotational unit within an air-tightly closed space with electron beams of which an acceleration voltage is 20 kV through 100 kV, and a step of opening the air-tightly closed space, rotating the rotational unit and, in linkage with this operation, rotating a different rotational unit accommodating another disc-shaped object, thereby exchanging the post-irradiation disc-shaped object with the pre-irradiation disc-shaped object.

According to the second method of manufacturing the disc-shaped object, the surface of the on-rotating disc-shaped object is irradiated with the electron beams and can be therefore irradiated with the electron beams having the larger energy than the ultraviolet rays have, and hence, e.g., the lubricating layer, etc. composed of the material that is hard to be cured by the irradiation of the ultraviolet rays, can be easily cured. Moreover, the two rotational units are exchanged with each other by rotations in linkage with another rotational unit from the above rotational unit, thereby ejecting the post-irradiation disc-shaped object and supplying the pre-irradiation disc-shaped object. These two disc-shaped objects are thus efficiently exchanged with each other, and consequently the productivity is improved. Further, the electron beams having an acceleration voltage ranging from 20 kV to 100 kV is employed, whereby the energy of the electron beams is efficiently applied to, e.g., the lubricating layer over the thin range from the surface, and the electron beams do not affect the substrate, etc. existing thereunder.

The second method of manufacturing the disc-shaped object further comprises a step of forming a resin layer and/or a surface layer on the pre-irradiation disc-shaped object, wherein the resin layer and/or the surface layer can be cured by the irradiation of the electron beams.

DETAILED DESCRIPTION OF THE INVENTION

Each of electron beam irradiation apparatuses according to a first embodiment and a third embodiment of the present invention and a disc-shaped medium manufacturing apparatus according to a second embodiment of the present invention, will hereinafter be described with reference to the drawings.

<First Embodiment>

Figure 1:
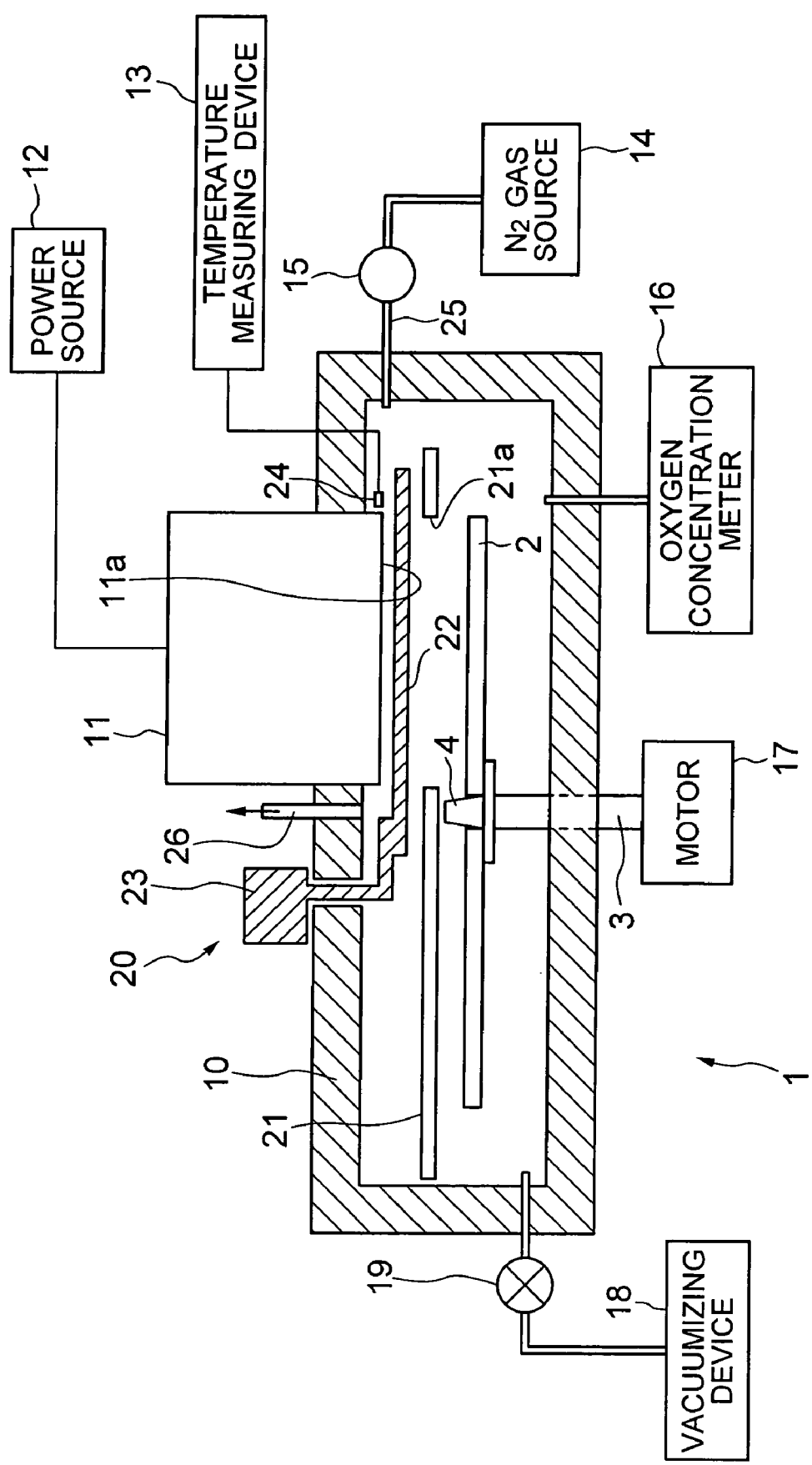
FIG. 1 is a side sectional view schematically showing an electron beam irradiation apparatus in a first embodiment.
Figure 2:
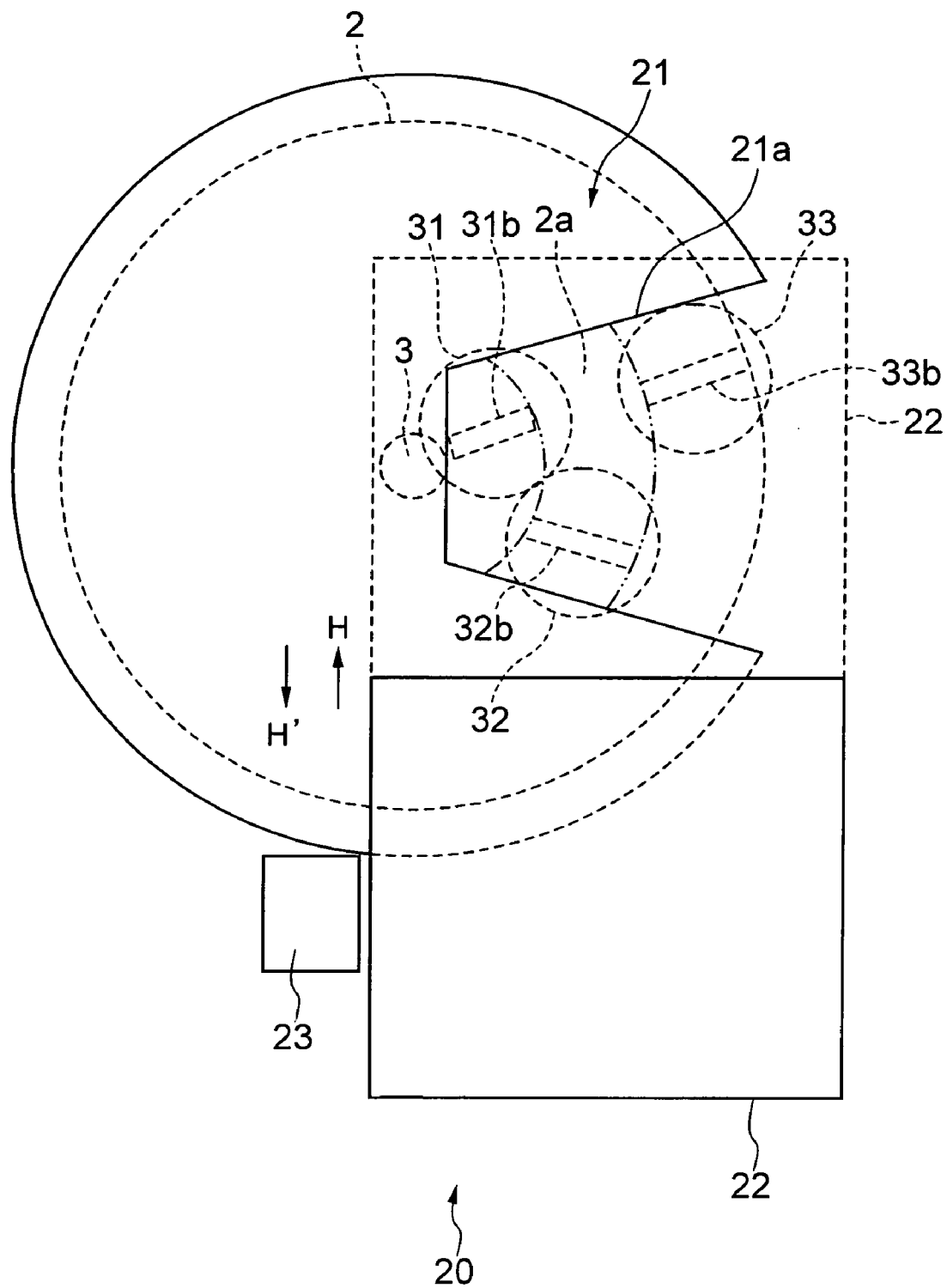
FIG. 2 is a plan view schematically showing a shutter member and a shutter driving mechanism of the electron beam irradiation apparatus in FIG. 1.
Figure 3:
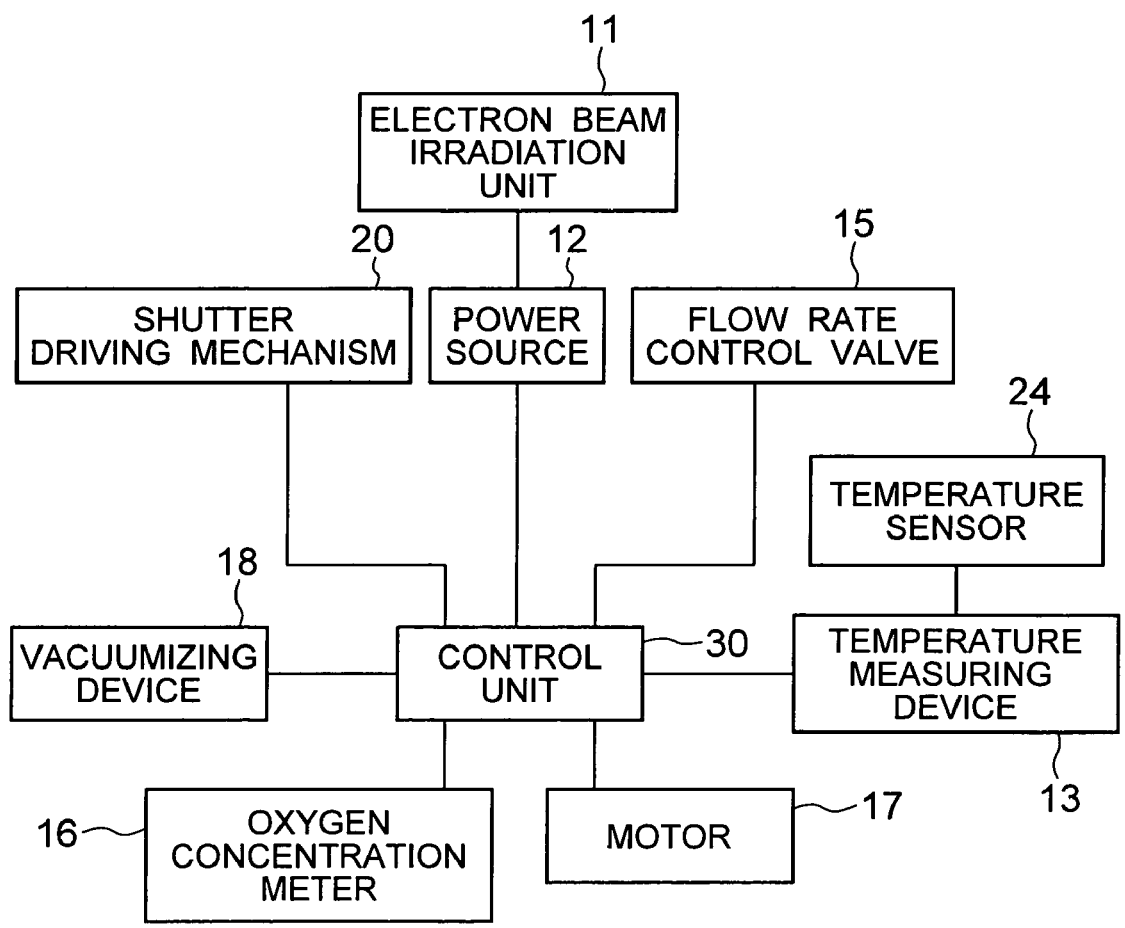
FIG. 3 is a block diagram showing a control system of the electron beam irradiation apparatus in FIG. 1.
Figure 4:
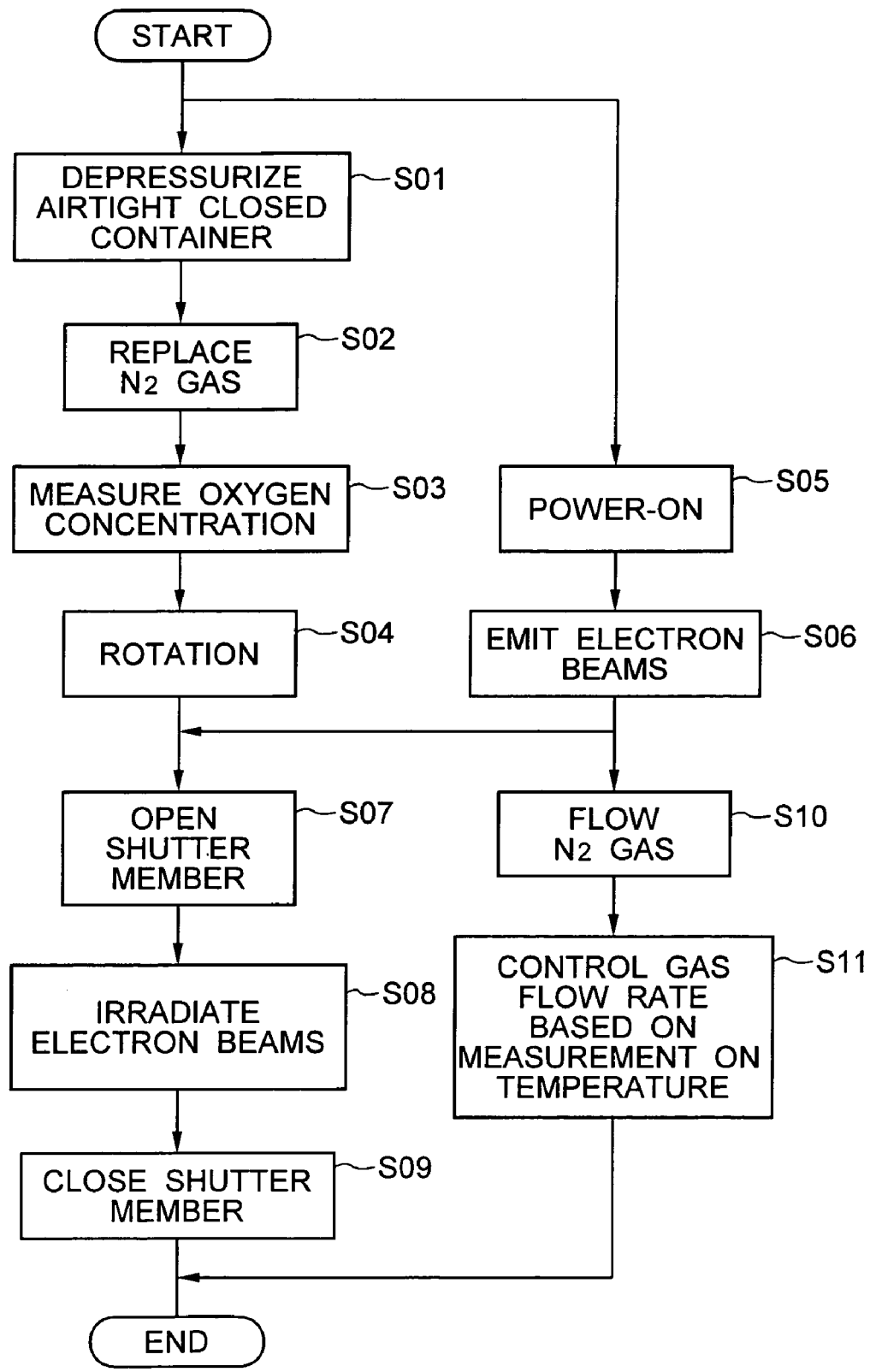
FIG. 4 is a flowchart showing an operation of the electron beam irradiation apparatus in FIG. 1.

FIG. 1 is a side view schematically showing the electron beam irradiation apparatus in the embodiment of the present invention. FIG. 2 is a plan view schematically showing a shutter member and a shutter driving mechanism of the electron beam irradiation apparatus in FIG. 1. FIG. 3 is a block diagram showing a control system of the electron beam irradiation apparatus in FIG. 1. FIG. 4 is a flowchart showing an operation of the electron beam irradiation apparatus in FIG. 1.

As illustrated in FIG. 1, an electron beam irradiation apparatus 1 includes a shield container 10 that rotatably accommodates an object 2 to be rotated and is composed of stainless steel in order to shield the electron beams, a motor 17 for rotationally driving the object 2 held by engaging a central hole of the object 2 with an engaging member 4 through a rotary shaft 3, an electron beam irradiation unit 11 for irradiating the object 2 with the electron beams under a low-acceleration voltage in a radial direction from an irradiation window 11a, a power source 12 for applying a voltage to the electron beam irradiation unit 11, a temperature sensor 24 disposed in the vicinity of the irradiation window 11a, and a temperature measuring device 13 that is connected to the temperature sensor 24 and measures an ambient temperature to the irradiation window 11a.

The electron beam irradiation apparatus 1 further includes an oxygen concentration meter 16 for measuring an oxygen concentration of oxygen in an airtight closed space within the shield container 10, a vacuumizing device 18 for evacuating and thus depressurizing an interior of the shield container 10 from a valve 19, a nitrogen gas source 14 that supplies a nitrogen gas for replacing the interior of the shield container 10 with a nitrogen gas atmosphere, and a gas flow rate control valve 15 capable of controlling a gas flow rate when the nitrogen gas flows so that the nitrogen gas is introduced from a gas introduction port 25, passes through in the vicinity of the irradiation window 11a and is discharged from a gas discharge port 26. Further, the gas discharge port 26 is provided with a valve (unillustrated).

The electron beam irradiation apparatus 1 further includes an aperture-formed disc 21 having a larger diameter than that of the object 2 and disposed between the object 2 and the irradiation window 11a of the electron beam irradiation unit 11, and a shutter driving mechanism 20 having a shutter member 22 disposed between the disc 21 and the irradiation window 11a, and a slider 23 for driving the shutter member 22.

As shown in FIG. 2, the disc 21 has a fan-shaped aperture 21a, wherein the electron beams emitted from the electron beam irradiation unit 11 pass through this aperture 21a and fall upon a radial area 2a formed between an inner peripheral side portion and an outer peripheral side portion of the object 2 in the radial direction.

Further, the shutter member 22 is formed, in a rectangular shape, of iron and steel or stainless steel that shields the electron beams. The shutter member 22, when driven by the slider 23 in a slide direction H in FIG. 2, as depicted by a broken line in FIG. 2, moves to a closing position for completely covering and closing the fan-shaped aperture 21a of the disc 21 and thus blocks the electron beams emitted from the electron beam irradiation unit 11, with the result that the radial area 2a of the object 2 is not irradiated with the electron beams. Further, the shutter member 22, when driven by the slider 23 in a slide direction H' opposite to the direction H, as depicted by a solid line in FIG. 2, moves completely off the aperture 21a back to an opening position for opening the aperture 21a, whereby the electron beams emitted from the electron beam irradiation unit 11 are permitted to pass therethrough and fall upon the radial area 2a of the object 2.

Further, as illustrated in FIG. 2, the electron beam irradiation unit 11 includes cylindrical electron beam irradiation tubes 31, 32, 33 arranged in the radial direction of the object 2, and the electron beam irradiation tubes 31, 32, 33 have elongate rectangular irradiation windows 31b, 32b, 33b, respectively. The irradiation windows 31b, 32b, 33b are disposed along a plurality of straight lines extending respectively in the radial direction of the object 2.

Moreover, as depicted by 2-dotted chain lines in FIG. 2, an outer peripheral edge of the irradiation window 31b and an inner peripheral edge of the irradiation window 32b exist on a concentric circle, and similarly an outer peripheral edge of the irradiation window 32b and an inner peripheral edge of the irradiation window 33b exist on a concentric circle, wherein the irradiation windows 31b, 32b, 33b become continuous in the radial direction on the surface of the object 2.

A voltage is applied to each of the electron beam irradiation tubes 31 through 33 from the power source 12, and the radial area 2a of the object 2 is irradiated with the electron beams, of which an acceleration voltage is on the order of 20 kV through 100 kV, emitted from the irradiation windows 31b, 32b, 33b.

The thus-constructed electron beam irradiation apparatus 1 in FIGS. 1 and 2, irradiates the electron beams in a way that controls the whole as shown in FIG. 3 by the control unit 30. Respective steps S01 through S11 of the operation of the electron beam irradiation apparatus 1 will be described with reference to FIG. 4.

Under the control of the control unit 30, to begin with, after closing the valve at the gas discharge port 26, the vacuumizing device 18 operates to depressurize the interior of the shield container 10 (S01), then the valve 19 is closed, and the nitrogen gas is introduced into the shield container 10 from a gas flow rate control valve 15 from the nitrogen gas source 14 (S02). The interior of the shield container 10 can be thereby easily replaced with a nitrogen atmosphere.

Then, the oxygen concentration meter 16 detects a decrease down to a predetermined oxygen concentration in the interior of the shield container 10 (S03), and the object 2 is rotated at a predetermined rotating speed by driving the motor 17 (S04). On the other hand, the voltage is applied to the electron beam irradiation unit 11 from the power source 12 (S05), thereby generating the electron beams (S06). At this time, the shutter member 22 is in the closing position, thereby controlling an emission quantity of the electron beams down to a small level.

Next, the shutter member 22 existing in the closing position shown by the broken line in FIG. 2 is moved in the slide direction H' to the opening position by operating the shutter driving mechanism 20 and thus driving the slider 23, thereby unclosing the aperture 21a (S07). At the same time, the emission quantity of the electron beams is controlled up to a large level, and the surface of the radial area 2a of the on-rotating object 2 is irradiated with the electron beams (S08). Thus, the irradiation of the electron beams is effected in the radial direction of the on-rotating object 2, and hence the whole surface of the object 2 can be irradiated with the electron beams.

Then, after irradiating the object 2 with the electron beams for only a predetermined period of time, similarly the shutter member 22 is moved in the slide direction H by operating the shutter driving mechanism 20 to the closing position, thereby closing the aperture 21a (S09). Then, the irradiation of the electron beams upon the object 2 is finished.

Further, during the emission of the electron beams from the electron beam irradiation unit 11, the nitrogen gas from the nitrogen gas source 14 flows through the vicinity of the irradiation window 11a from the gas introduction portion 25 and further flows into the gas discharge portion 26 (S10), thereby making it possible to cool off the irradiation window 11a that rises in its temperature when emitting the electron beams and likewise cool off the shutter member 22. Moreover, a temperature ambient to the irradiation window 11a is measured by the temperature sensor 24 and by the temperature measuring device 13, and a flow rate of the nitrogen gas is controlled based on this measured temperature by the gas flow rate control valve 15 (S11). The temperature ambient to the irradiation window 11a can be controlled to be equal to or lower than a fixed temperature.

As described above, according to the electron beam irradiation apparatus in FIGS. 1 through 4, the surface of the on-rotating object 2 is irradiated with the electron beams, thereby enabling the surface of the object 2 to be highly efficiently irradiated with the electron beams exhibiting greater energy than the ultraviolet rays have. It is therefore feasible to facilitate curing of a lubricating layer, etc. made of a material that is hard to be cured by the irradiation of, for example, the ultraviolet rays.

Further, the surface of the object 2 is irradiated with the electron beams of which the acceleration voltage is as low as 20 kV through 100 kV, whereby the electron beam energy can be highly efficiently applied across the surface of the object 2 over a thin range, e.g., over the lubricating layer, and deterioration of a substrate, etc. can be prevented without exerting influence of the electron beams upon the substrate, etc. existing thereunder.

Moreover, the irradiation of the electron beams is conducted after reducing the oxygen concentration in the interior of the shield container 10 down to the predetermined level, so that an inhibition of radical reaction caused by oxygen in the vicinity of the surface of the object 2 irradiated with the electron beams is hard to occur, thereby making it possible to ensure preferable hardening reaction in the lubricating layer, etc.

<Second Embodiment>

Next, an apparatus for manufacturing the disc-shaped medium will be described by way of a second embodiment. FIGS. 5 through 9 are side views of the manufacturing apparatus, explaining respective processes for forming the lubricating layer on the disc-shaped medium according to the second embodiment.

As shown in FIGS. 5 through 9, a disc-shaped medium manufacturing apparatus (which will hereinafter be simply termed a [manufacturing apparatus]) 50 has an airtight closable chamber 51 accommodating the electron beam irradiation apparatus 1 that emits the electron beams of which the acceleration voltage is as low as 20 kV through 100 kV and irradiates the surface of a disc-shaped medium 49 with the electron beams, an exchange chamber 52 for supplying (loading) the pre-irradiation disc-shaped medium 49 into the electron beam irradiation apparatus 1 and receiving a post-irradiation disc-shaped medium 49a from the electron beam irradiation apparatus 1, and a rotational (turn) unit 54 that rotates about a rotary shaft 53 in order to exchange the pre-irradiation disc-shaped medium with the post-irradiation disc-shaped medium.

As shown in FIGS. 5 through 9, the manufacturing apparatus 50 further includes a disc carrying device 60 for carrying the disc-shaped medium in a way that loads the pre-irradiation disc-shaped medium into the exchange chamber 52 and ejects the post-irradiation disc-shaped medium.

The electron irradiation apparatus 1 is constructed substantially in the same way as in FIGS. 1 and 2, and hence a different point from the configuration in FIGS. 1 and 2 will be explained. To be specific, the shield container 10 in FIG. 1 is, referring to FIG. 5, divided into a rotational (turn) tray unit 10a, provided on a lower side as viewed in FIG. 5, that is configured in a tray-like shape so as to rotatably accommodate the disc-shaped medium 49, and an upper-side fixed unit 10b provided with the electron beam irradiation unit 11, the shutter driving mechanism 20, etc. The rotational tray unit 10a serving as a first rotational unit is movable to the side of the exchange chamber 52 in a way that moves up and down and turns with the aid of the rotational unit 54 with respect to the fixed unit 10b.

Figure 5:
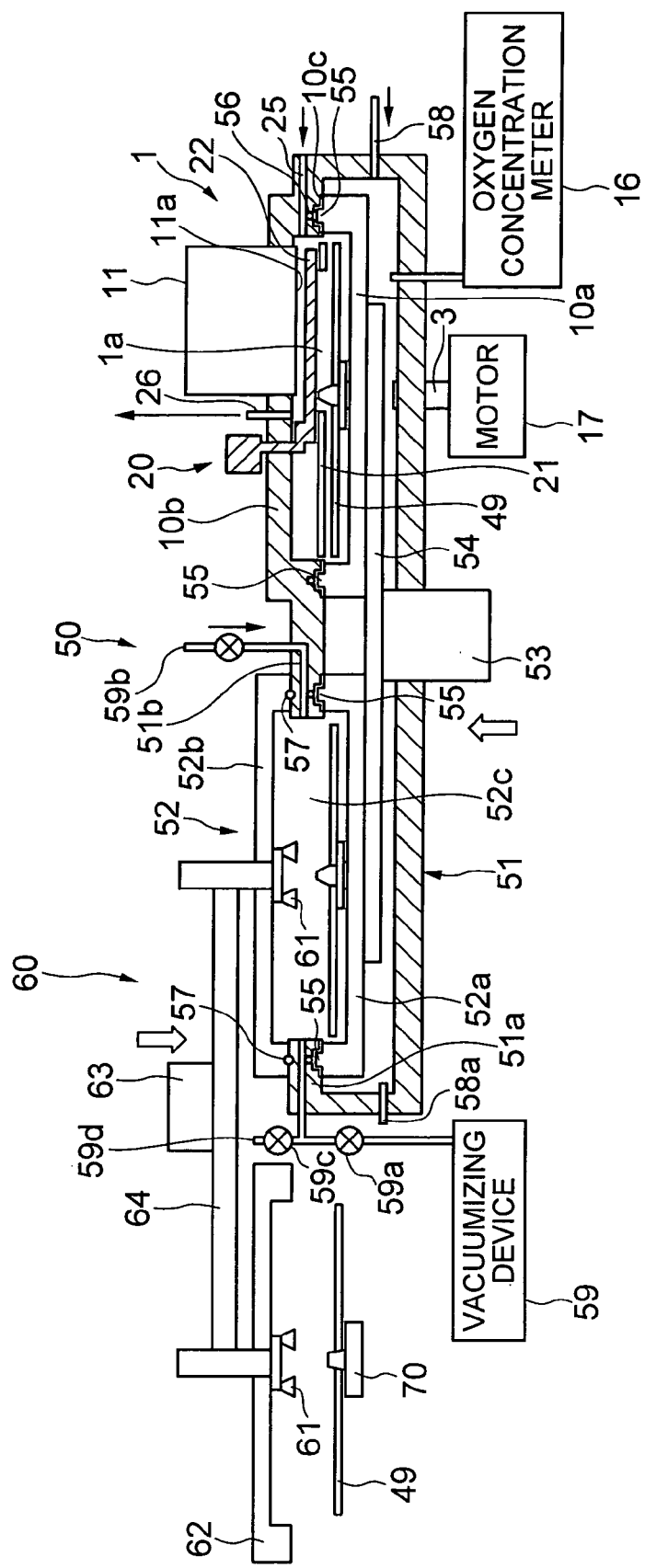
FIG. 5 is a side sectional view schematically showing an apparatus for manufacturing a disc-shaped medium according to a second embodiment, and is also an explanatory view showing a process just anterior to the electron beam irradiation for forming a lubricating layer, etc. on the disc-shaped medium.
Figure 10:
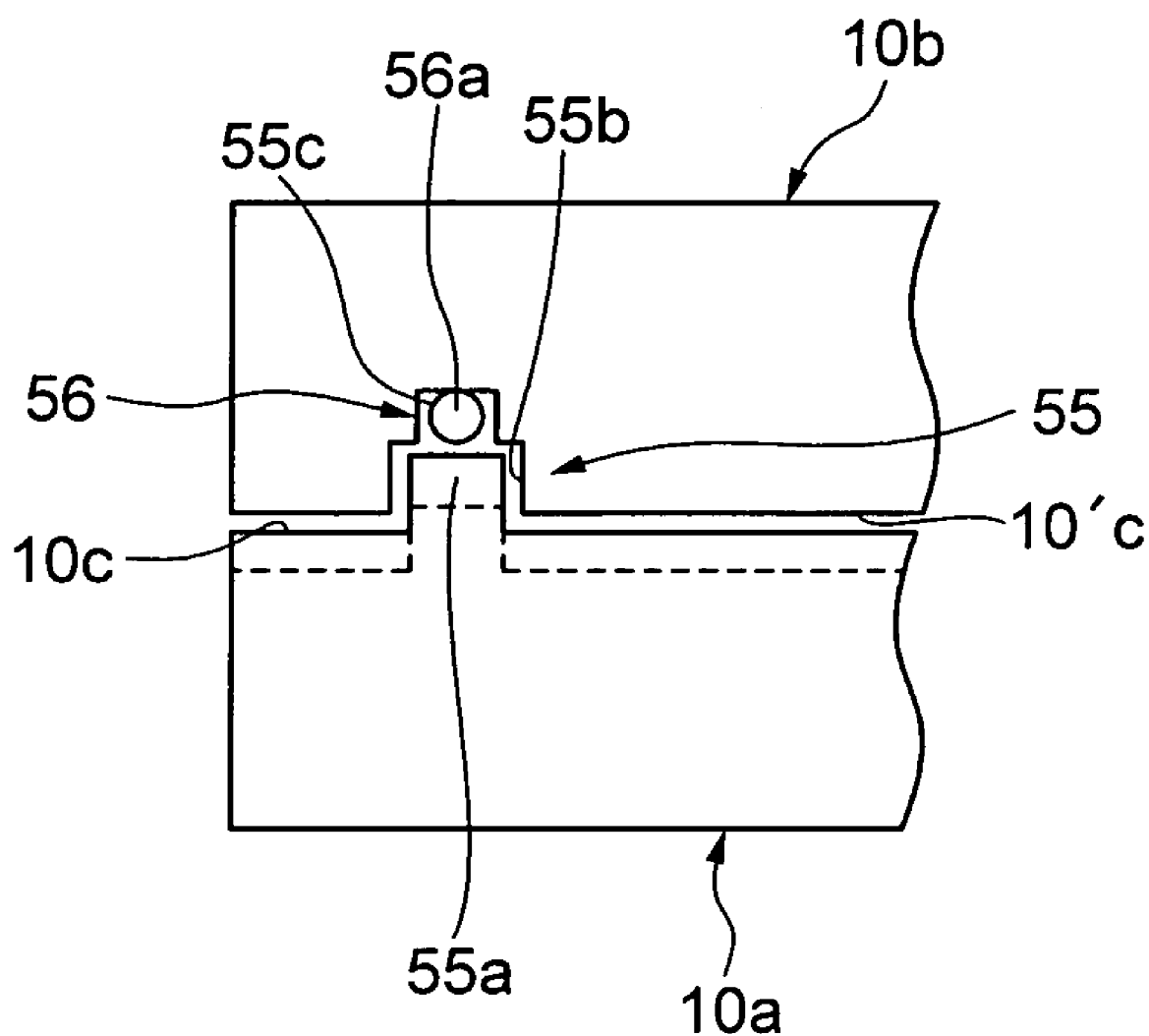
FIG. 10 is an enlarged sectional view showing a shield member 55 in the manufacturing apparatus in FIGS. 5 through 9.

As illustrated in FIG. 5, an abutting face 10c of the rotational tray unit 10a and an abutting face 10c' of the fixed unit 10b are provided with shield members 55 for shielding the electron beams so that the electron beams do not leak out. FIG. 10 is an enlarged sectional view showing the shield member 55. As shown in FIG. 10, the abutting face 10c of the rotational tray unit 10a has a protruded portion 55a formed along the entire periphery thereof, and the abutting face 10c' of the fixed unit lob has a recessed portion 55b formed along the entire periphery thereof, wherein the protruded portion 55a can be fitted in the recessed portion 55b.

Further, a bottom of the recessed portion 55b configuring the shield member 55 is further formed with a cavity 55c, and an O-ring 56a is accommodated in the cavity 55c, thus forming an airtight closed portion 56. The rotational tray unit 10a abuts on the fixed unit 10b, thereby making it possible to enhance airtightness in an airtight closed space 1a formed inside owing to the airtight closed portion 56.

In FIG. 10, the O-ring 56a in the airtight closed portion 56 is positioned much closer to the bottom within the cavity 55c from the recessed portion 55b and is not therefore irradiated with the electron beams directly, whereby the O-ring 56a can be prevented from being deteriorated.

As illustrated in FIG. 5, the exchange chamber 52 includes a rotational tray unit 52a serving as a second rotational unit that is moved up and down and rotated by the rotational unit 54 and is thus moved to the side of the electron beam irradiation apparatus 1, wherein this rotational tray unit 52a is exchangeable with the rotational tray unit 10a and configured in the tray shape. The exchange chamber 52 further includes a carry rotational tray unit 52b that receives the pre-irradiation disc-shaped medium and ejects the post-irradiation disc-shaped medium to the outside by use of the disc carrying device 60.

The chamber 51 has an edge portion 51a and a connecting portion 51b that configure part of the exchange chamber 52. The edge portion 51a and the connecting portion 51b are interposed serving as abutting faces between the rotational tray unit 52a and the carry rotational tray unit 52b of the exchange chamber 52, whereby an airtight closed space 52c is formed within the exchange chamber 52 and at the same time the carry rotational tray unit 52b configures part of the chamber 51.

Moreover, airtight closed portions 57 each using an O-ring are provided on an abutting face between the edge portion 51a and the carry rotational tray unit 52b and on an abutting face between the connecting portion 51b and the carry rotational tray unit 52b. Further, the same shield portions 55 and the same airtight closed portions 56 as those in FIG. 10 are respectively provided on the abutting face between the edge portion 51a and the rotational tray unit 52a and on the abutting face between the connecting portion 51b and the rotational tray unit 52a.

The chamber 51 connects to the fixed unit 10b on the side of the edge portion of the electron beam irradiation apparatus 1, the connecting portion 51b connects to the fixed unit 10b in the vicinity of a central portion, and the carry rotational tray unit 52b is air-tightly closed by the edge portion 51a and by the connecting portion 51b, thereby becoming air-tightly closable on the whole. Moreover, the chamber 51, the carry rotational tray unit 52b (62), the rotational tray unit 10a, the fixed unit 10b, etc., are made of iron and steel, stainless steel and so on, thereby shielding the electron beams to prevent the electron beams from leaking to the outside.

Figure 9:
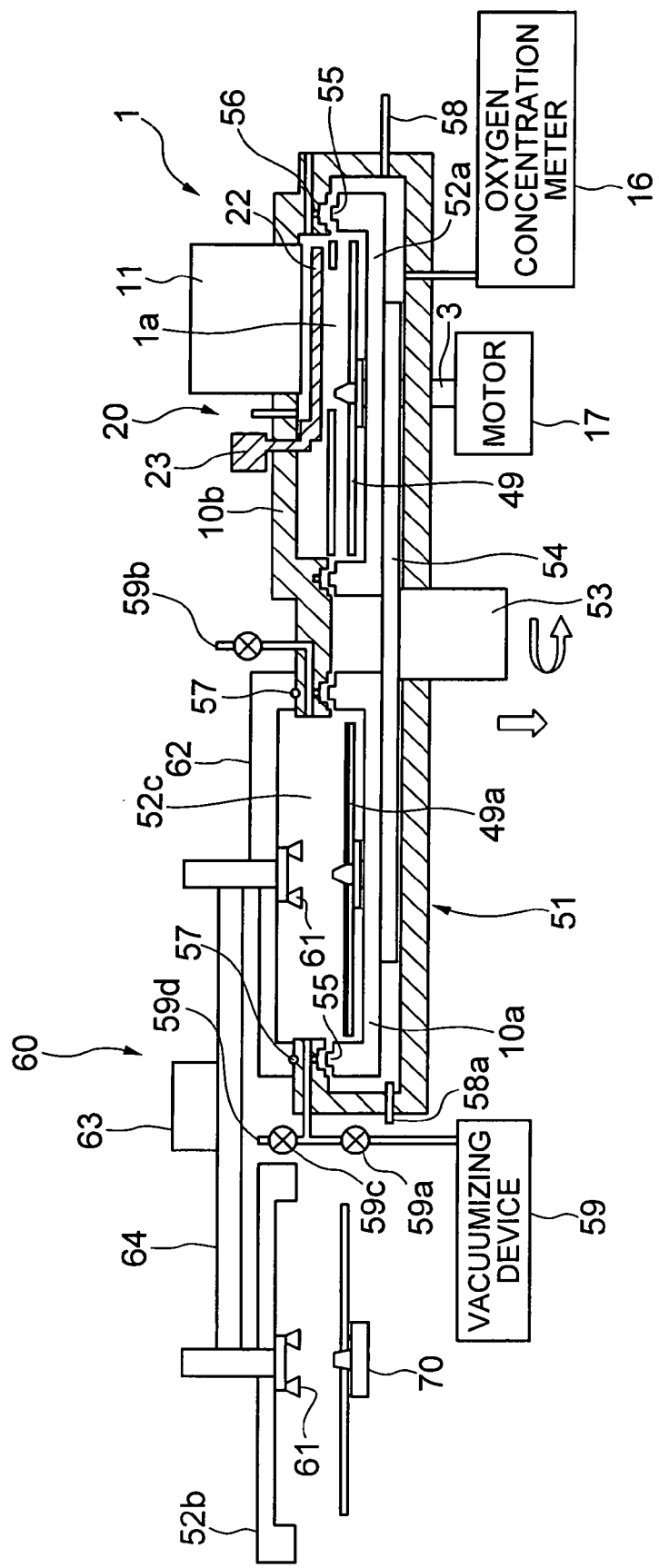
FIG. 9 is a side sectional view similar to FIG. 5, and is also an explanatory view showing the process of exchanging the disc-shaped medium internally in order to form the lubricating layer, etc. on the disc-shaped medium.

The nitrogen gas can be introduced into the chamber 51 from a nitrogen gas introduction port 58, and the airtight closed space 52c within the exchange chamber 52 can be depressurized by a vacuumizing device 59. As shown in FIG. 9, in a state where the whole chamber 51 is air-tightly closed, the rotational unit 54 moves together with the rotational tray units 10a, 52a downward as viewed in FIG. 9, and the airtight closed spaces 1a, 52c are opened. This case indicates a state in which (the interior of) the exchange chamber 52 is replaced with the nitrogen gas, and hence the interior of the chamber 51 does not affect the nitrogen gas atmosphere in the airtight closed space 1a of the electron beam irradiation apparatus 1.

Moreover, the nitrogen gas can be introduced into the exchange chamber 52 from a nitrogen gas introduction port 59b. Further, the nitrogen gas in the chamber 51 can be discharged from a gas discharge port 58a.

As shown in FIG. 5, the disc carrying device 60 includes another carry rotational tray unit 62 exchangeable with the carry rotational tray unit 52b configuring the exchange chamber 52, and a rotational unit (rotational plate) 64 that rotates the carry rotational tray units 52b, 62 through a rotary shaft 63. Each of the carry rotational tray units 52b, 62 has an adsorbing member 61 for vacuum-adsorbing the disc-shaped medium 49 in the vicinity of the periphery of a central hole of the disc-shaped medium 49. The rotational unit 64 makes the up-and-down and rotational movements and thus carries the disc-shaped medium between the exchange chamber 52 and an external disc transferring/receiving unit 70.

The disc-shaped medium 49 supplied from the disc transferring/receiving unit 70 to the exchange chamber 52 is formed on its surface with a light transmitting layer containing a resinous material and a lubricating layer composed of a lubricant thereon by use of an external spin coat device.

A material for forming this type of light transmitting layer is not particularly limited on condition that it is an active energy ray curing compound. It is, however, preferable that this material contains at least one reactive group selected from within a (meta) acryloyl group, a vinyl group and a mercapto group. For others, the aforementioned material may contain a known photo-polymerization initiator.

Further, for example, a silicone compound and a fluorine compound each exhibiting radical polymerization property are given as materials for forming the lubricating layer. The materials are not, however, limited to those aforementioned. Those lubricating layer forming materials are generally hard to be cured by ultraviolet rays in the case of containing no photo-polymerization initiator but can be instantaneously cured by the electron beams.

Next, an operation of the manufacturing apparatus 50 described above will be explained with reference to flow-charts in FIGS. 5 through 9 and 11 in a way that divides the operation into the irradiation of the electron beams upon the disc-shaped medium and the ejecting/supplying of the disc-shaped medium.

<Irradiation of Electron Beams upon Disc-Shaped Medium>

Figure 11:
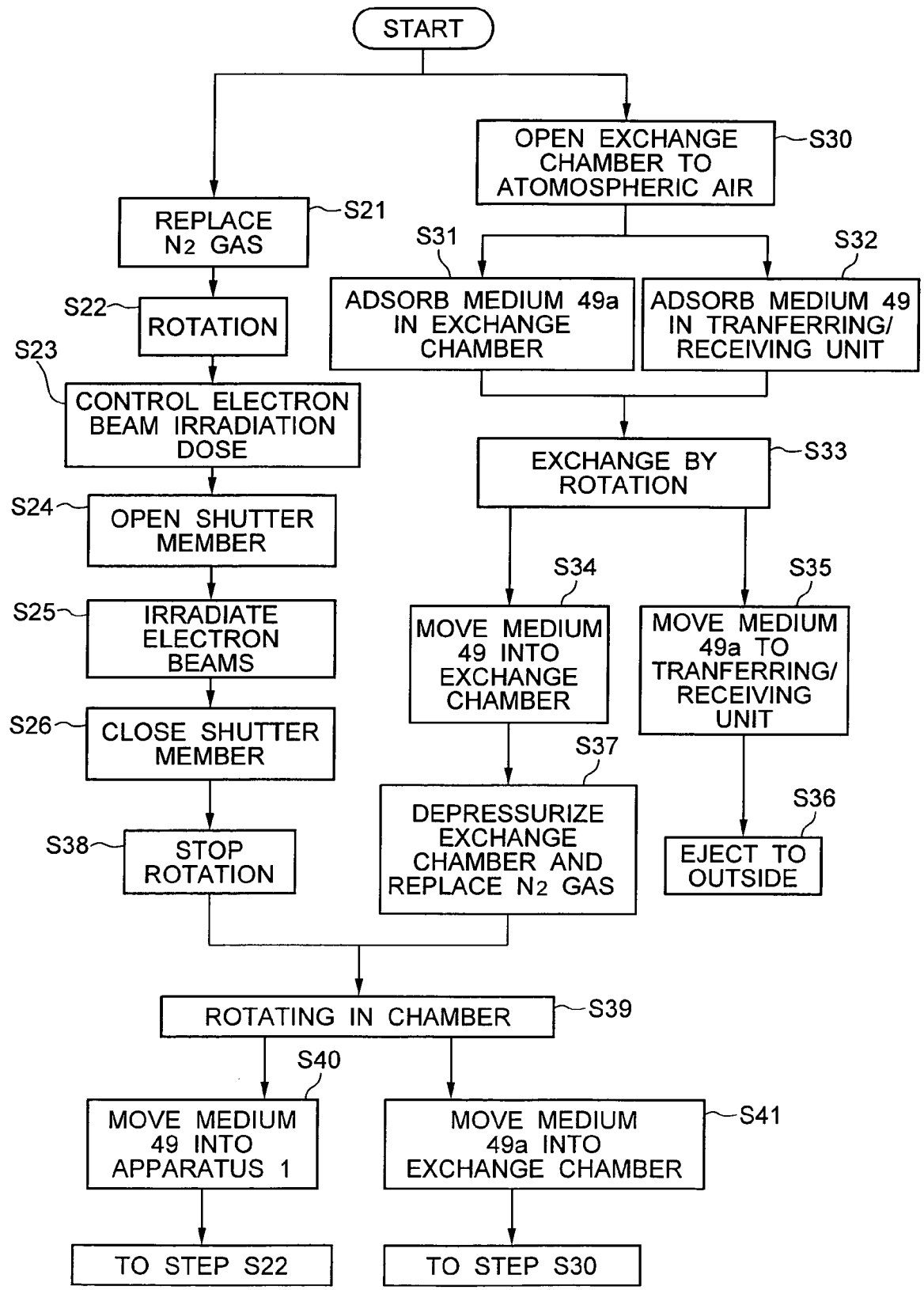
FIG. 11 is a flowchart showing respective steps of irradiating a disc-shaped medium with electron beams and respective steps of ejecting and supplying the disc-shaped medium in the manufacturing apparatus in FIGS. 5 through 9.

As shown in FIG. 11, to begin with, the whole chamber 51 is air-tightly closed as illustrated in FIG. 9, and the rotary shaft 53 and the rotational unit 54 moves downward as viewed in FIG. 9 together with the rotational tray units 10a, 52a. Then, after the airtight closed spaces 1a, 52c have been opened, the nitrogen gas is introduced into the chamber 51 from the nitrogen gas introduction port 58, thereby replacing the interior thereof with the nitrogen gas atmosphere (S21). At this time, the replacement with the nitrogen gas can be performed while measuring a concentration of oxygen in the chamber 51 by the oxygen concentration meter 16.

Next, when the rotary shaft 53 and the rotational unit 54 move upward as viewed in the Figure together with the rotational tray units 10a, 52a, as shown in FIG. 5, the airtight closed spaces 1a, 52c are formed. Then, in the electron beam irradiation apparatus 1, the disc-shaped medium 49 is rotated by the motor 17 within the airtight closed space 1a (S22), the electron beam irradiation unit 11 is controlled to emit a predetermined amount of electron beams (S23), and the nitrogen gas flows through the vicinity of the irradiation window 11a toward the gas discharge port 26 from the gas introduction port 25.

Figure 6:
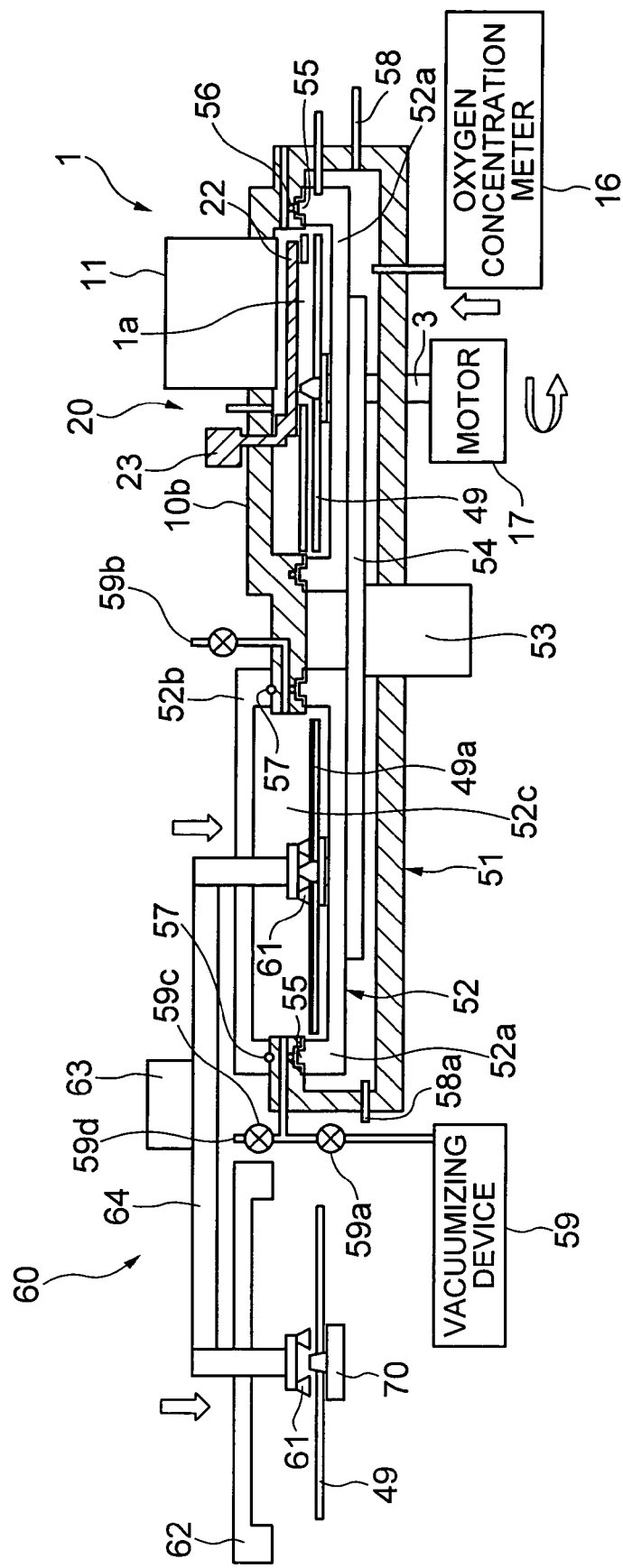
FIG. 6 is a side sectional view similar to FIG. 5, and is also an explanatory view showing the electron beam irradiation for forming the lubricating layer, etc. on the disc-shaped medium and a process of exchanging the disc-shaped medium with an external disc-shaped medium.

Next, as shown in FIG. 6, the shutter member 22 is opened by the shutter driving mechanism 20 (S24), the surface, formed with the lubricating layer on the light transmitting layer, of the on-rotating disc-shaped medium 49 is irradiated with the electron beams emitted from the electron beam irradiation unit 11 (S25). After the irradiation of the electron beams is effected for only a predetermined period of time as in FIG. 7, the shutter member 22 is closed by the shutter driving mechanism 20 as in FIG. 8 (S26), thereby finishing the irradiation of the electron beams upon the surface of the disc-shaped medium 49. This enables acquisition of the disc-shaped medium 49a including the lubricating layer fixed onto the surface of the light transmitting layer of the disc-shaped medium 49. This is considered such that the light transmitting layer is cured, and at the same time the reactive group of the lubricant is bound (cured) with reactive groups of the surface of the light transmitting layer and of other lubricant.

<Ejecting/Supplying of Disc-Shaped Medium>

In a state where the airtight closed space 52c is formed within the exchange chamber 52 as shown in FIG. 5, the airtight closed space 52c in the exchange chamber 52 accommodating the post-irradiation disc-shaped medium 49a inside is opened to the atmospheric air through an opening valve 59c and an opening port 59d as shown in FIG. 6 (S30).

Then, the disc carrying device 60 moves the adsorbing member 61 provided on the side of the carry rotational tray unit 52b downward as viewed in FIG. 6 through the rotary shaft 63 and the rotational unit 64, thereby absorbing the disc-shaped medium 49a (S31). Almost simultaneously with this, the adsorbing member 61 on the side of another carry rotational tray unit 62 adsorbs the pre-irradiation disc-shaped medium 49 formed with the lubricating layer on its surface, which is accommodated in the external disc transferring/receiving unit 70 (S32).

Figure 7:
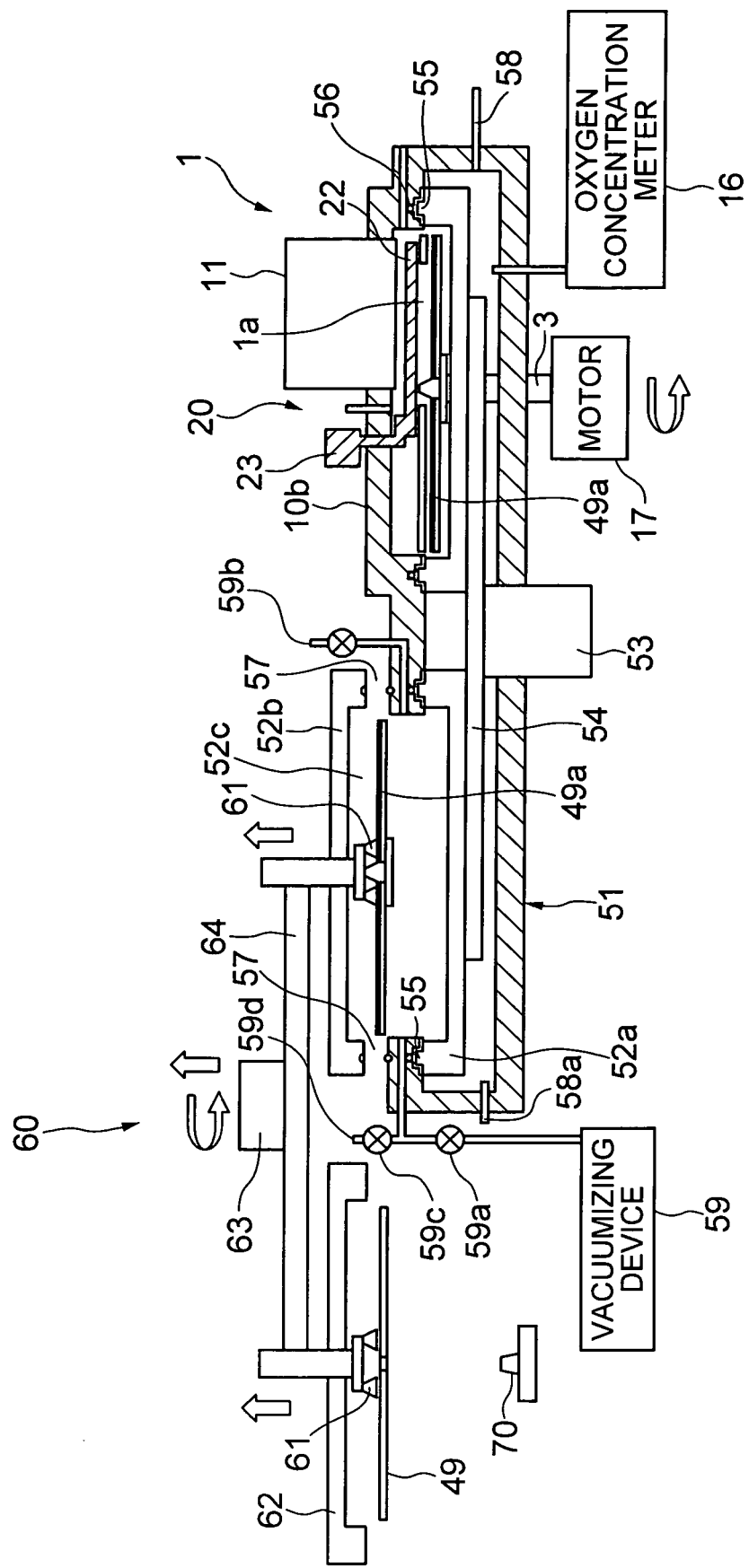
FIG. 7 is a side sectional view similar to FIG. 5, and is also an explanatory view showing the electron beam irradiation for forming the lubricating layer, etc. on the disc-shaped medium and a process of exchanging the disc-shaped medium with the external disc-shaped medium.

Next, as illustrated in FIG. 7, the disc carrying device 60 raises the disc-shaped medium 49a from within the rotational tray unit 52a together with the absorbing member 61 and the carry rotational tray unit 52b by moving the rotary shaft 63 and the rotational unit 64 upward as viewed in FIG. 7, and simultaneously raises the disc-shaped medium 49 together with the absorbing member 61 and the carry rotational tray unit 62. Then, the rotational unit 64 rotates about the rotary shaft 63, whereby the carry rotational tray units 52b and 62 are replaced in their positions with each other (S33).

Figure 8:
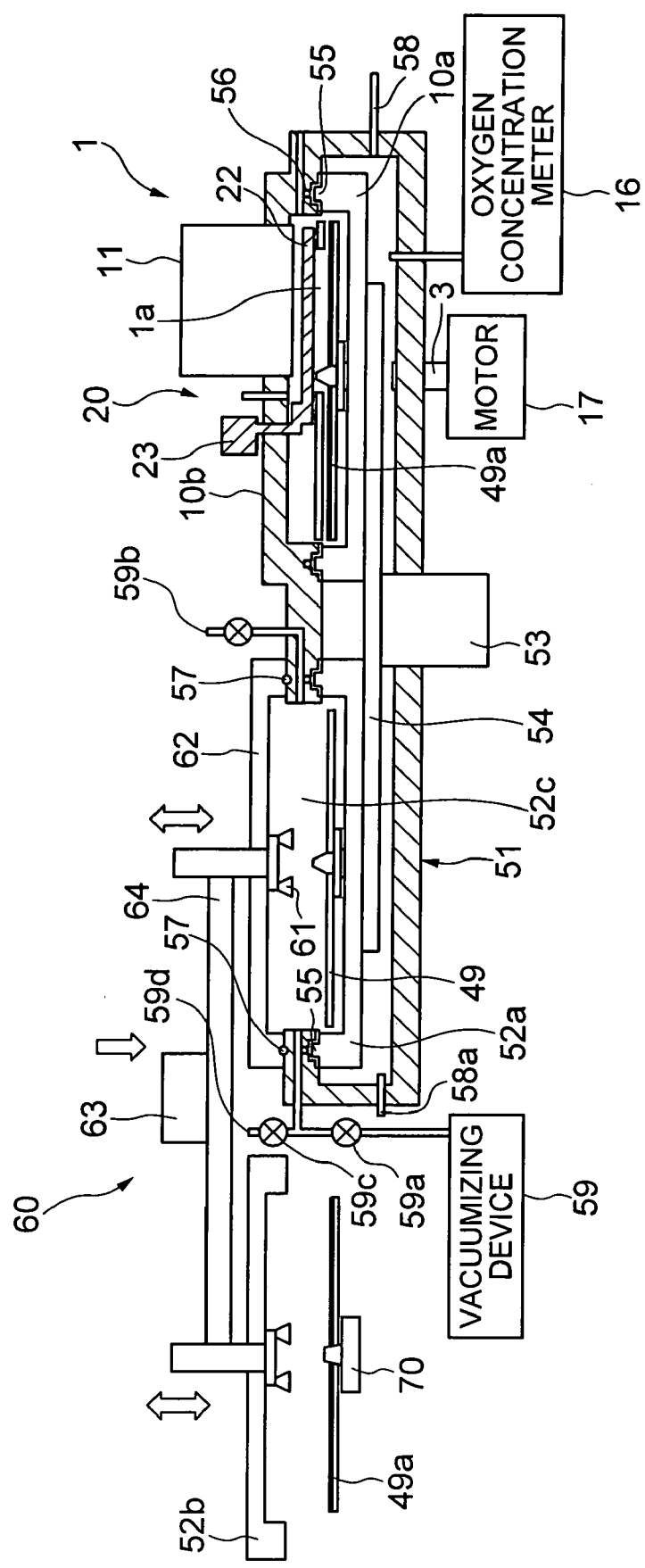
FIG. 8 is a side sectional view similar to FIG. 5, and is also an explanatory view showing a preparatory process (such as depressurizing an interior of an exchange chamber, replacing a nitrogen gas, etc.) to the process of exchanging the disc-shaped medium internally in order to form the lubricating layer, etc. on the disc-shaped medium.

Next, as shown in FIG. 8, the disc carrying device 60 moves the rotary shaft 63 and the rotational unit 64 downward as viewed in FIG. 7, thereby setting the disc-shaped medium 49a into the rotational tray unit 52a of the exchange chamber 52 (S34). On the other hand, the disc-shaped medium 49a is transferred to the disc transferring/receiving unit 70 (S35), and the respective adsorbing members 61 stop adsorbing the disc-shaped mediums 49, 49a and move upward as viewed in FIG. 8. The disc-shaped medium 49a is ejected to the outside from the disc transferring/receiving unit 70 (S36).

Then, the airtight closed space 52c, which is formed again in the manner described above, within the exchange chamber 52 is depressurized by the vacuumizing device 59, and the nitrogen gas is introduced from the nitrogen gas introduction port 59b, wherein the replacement of the nitrogen gas is conducted beforehand (S37).

In the way described above, the disc-shaped medium 49a after being irradiated with the electron beams can be carried up to the disc transferring/receiving unit 70 from the exchange chamber 52, and at the same time the disc-shaped medium 49 before being irradiated with the electron beams can be carried up to the exchange chamber 52 from the disc transferring/receiving unit 70. Thus, the disc-shaped mediums 49, 49a can be exchanged by the single rotational operation of each of the rotary shaft 63 and the rotational unit 64.

Further, the exchange between the disc-shaped mediums 49, 49a can be efficiently executed during the irradiation of the electron beams by the electron beam irradiation apparatus 1 because of the airtight closed spaces 1a, 52c being independent of each other as shown in FIGS. 6 and 7.

Next, an exchanging operation of the disc-shaped medium between the exchange chamber 52 and the electron beam irradiation apparatus 1 will be explained. To be specific, as illustrated in FIG. 8, the rotational tray unit 52a of the exchange chamber 52 accommodates the pre-irradiation disc-shaped medium 49. In the electron beam irradiation apparatus 1, the rotation by the motor 17 is stopped (S38), the disc-shaped medium 49a that has finished being irradiated with the electron beams is housed in the rotational tray unit 10a, and, in this state, the rotary shaft 53 and the rotational unit 54 move downward as viewed in FIG. 8, whereby the rotational tray units 52a, 10a move downward to open the airtight closed spaces 52c, 1a. Note that the interior of the airtight closed space 52c has been replaced with the nitrogen gas atmosphere at that time, and hence there is no influence on other portions within the chamber 51.

Next, as shown in FIG. 9, the rotational unit 54 rotates about the rotary shaft 53 within the chamber 51, thereby exchanging the rotational tray units 52a, 10a in their positions with each other (S39). With this operation, the pre-irradiation disc-shaped medium 49 housed in the rotational tray unit 52a is moved into the electron beam irradiation apparatus 1 (S40), and, almost simultaneously with this, the disc-shaped medium 49a housed in the rotational tray unit 10a is moved into the exchange chamber 52 (S41).

In the way explained above, the disc-shaped mediums 49, 49a can be exchanged with each other between the exchange chamber 52 and the electron beam irradiation apparatus 1 by performing one rotational operation of each of the rotary shaft 53 and the rotational unit 54. Then, the rotary shaft 53 and the rotational unit 54 move upward as viewed in the Figure in order to move upward the rotational tray units 52a, 10a, whereby the airtight closed spaces 52c, 1a are again formed as shown in FIG. 5. Then, in the electron beam irradiation apparatus 1 the operation returns to step S22 described above, and in the exchange chamber 52 the operation goes back to step S30, thus enabling the same operations to be repeated.

Note that the rotary shaft 3 of the motor 17 is contrived to, when the rotary shaft 53 and the rotational unit 54 rotate, retreat downward from the rotational unit 54 and from the rotational tray unit 10a, thus permitting the rotational unit 54 to rotate.

As explained above, according to the manufacturing apparatus 50 in FIGS. 5 through 9, the disc-shaped medium 49 of which the surface is formed with the lubricating layer, etc. is rotated, and the on-rotating disc-shaped medium is irradiated with the electron beams whose acceleration voltage is as low as 20 kV through 100 kV. It is therefore possible to irradiate instantaneously the disc-shaped medium at a high efficiency with the electron beams exhibiting the greater energy than the ultraviolet rays have. This enables both of facilitation of curing and fixing the lubricating layer, etc. that is hard to be cured by the irradiation of the ultraviolet rays and the instantaneous formation of the lubricating layer, etc. As a result of improving the productivity for forming the lubricating layer, etc., this improvement can contribute to enhance the productivity of the disc-shaped medium.

Further, in the interior of the chamber 51 and in the disc carrying device 60, the two pieces of rotational tray units are exchanged with each other by the single rotational operation of each rotational tray unit in synchronization between one rotational tray unit and the other rotational tray unit, thereby ejecting the post-irradiation disc-shaped medium 49a and supplying the pre-irradiation disc-shaped medium 49. The disc-shaped mediums 49, 49a can be thus efficiently exchanged with each other, and hence the productivity is improved.

Still, because of using the electron beams of which the acceleration voltage is as low as 20 Kv through 100 kV, the electron beam energy is efficiently applied to the lubricating layer, etc. existing over the thin range from the surface, and the electron beams do not affect the substrate existing thereunder.

Figure 12:
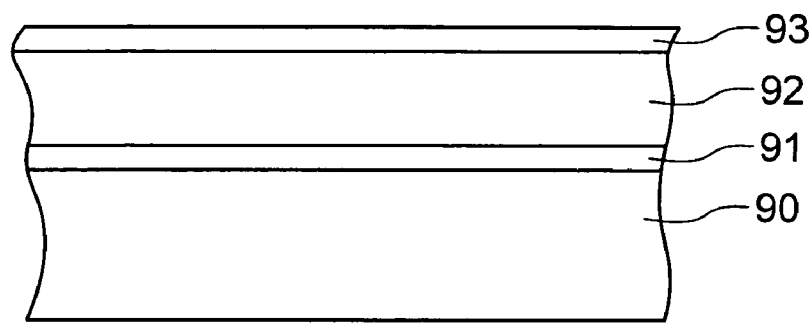
FIG. 12 is a diagram showing an example of a layer structure of an optical disc that can be manufactured by the manufacturing apparatus in FIGS. 5 through 9.

For example, the electron beam irradiation tubes 31–33 (FIG. 2), configuring the electron beam irradiation unit 11 of the electron beam irradiation apparatus 1, for irradiating the electron beams having the low acceleration voltage, are available on the market as offered by Ushio Electric Co., Ltd. The electron beam irradiation tube is capable of efficiently applying the electron beam energy to the lubricating layer/resin layer, etc. within a depthwise range that is on the order of 10 μm through 20 μm from the surface under the condition that the acceleration voltage is 50 kV, and a tube current is 0.6 mA per piece, and is capable of efficiently curing the layer instantaneously in less than 1 sec. For instance, the electron beam irradiation tube can simultaneously cure not only a lubricating layer 93 on the optical disc as shown in FIG. 12 but also even a portion, contiguous to the lubricating layer 93, of a light transmitting layer 92. Besides, for example, since the electron beams do not reach a substrate 90 existing under the lubricating layer 93 on the optical disc as illustrated in FIG. 12, and hence no damage is exerted on the substrate 90 composed of a resin material such as polycarbonate, etc., and there occurs none of adverse influence such as discoloration, deformation, deterioration and so forth.

Note that a window material for forming each of the irradiation windows 31b, 32b, 33b of the respective electron beam irradiation tubes 31, 32, 33 is preferably a silicon thin film having a thickness of approximately 3 μm, thereby making it possible to extract the electron beams accelerated at the acceleration voltage that is as low as 100 kV or under, which can not be extracted by the conventional irradiation window.

Figure 13:
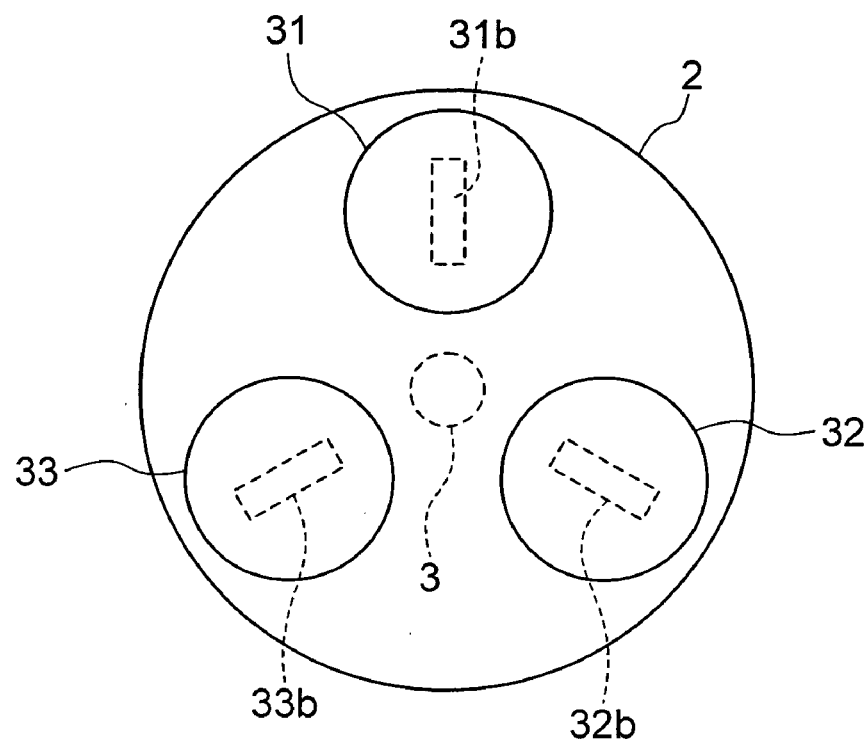
FIG. 13 is a plan view showing a modified example when arranging a plurality of electron irradiation tubes for an object to be rotated in FIG. 2.

Moreover, the positions of the plurality of electron beam irradiation tubes are not limited to those in FIG. 2, and the electron beam irradiation tubes may also be disposed in different relative positions to the object 2. For example, as shown in FIG. 13, the plurality of electron beam irradiation tubes 31, 32, 33 may be disposed at an interval of substantially equal angles with respect to the object 2 so that the irradiation windows 31b through 33b exist on the concentric circle. In this case, in the same way as in FIG. 2, the respective electron beam irradiation tubes 31, 32, 33 may also be disposed as they are shifted on an inner peripheral side, an intermediate side and an outer peripheral side in sequence.

Figure 14A:
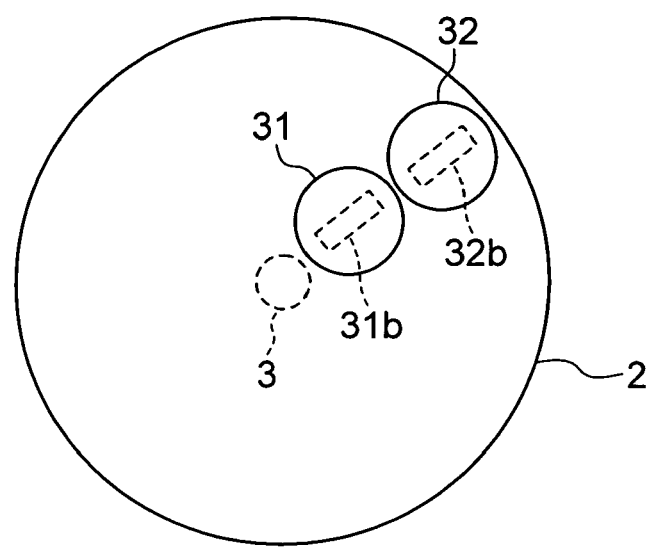
FIGS. 14A, 14B and 14C are plan views showing different modified examples when arranging a plurality of electron irradiation tubes for the object in FIG. 2.
Figure 14B:
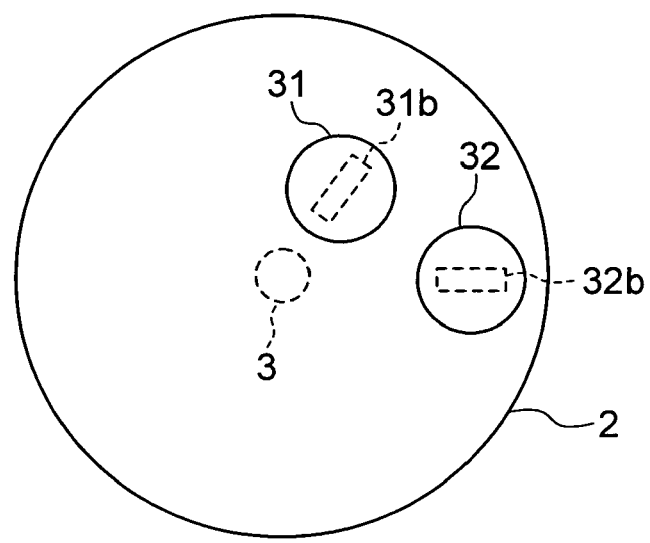
Figure 14C:
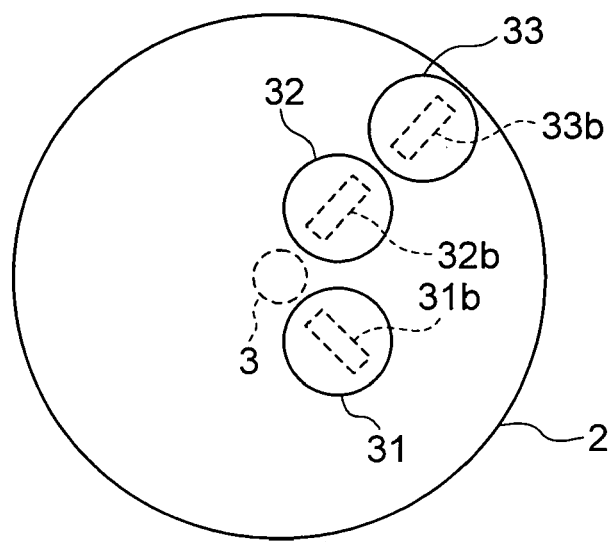

Further, as shown in FIG. 14A, the plurality of electron beam irradiation tubes 31, 32 may also be disposed side by side on a straight line extending in the radiation direction. Moreover, as illustrated in FIG. 14B, the plurality of electron beam irradiation tubes 31, 32 may also be disposed on a plurality of straight lines extending differently in the radial direction. Still further, as shown in FIG. 14C, the plurality of electron beam irradiation tubes 32, 33 may also be disposed on a straight line extending in the radial direction, and the other electron beam irradiation tube 31 may be disposed on a different straight line extending in the radial direction.

Further, in FIGS. 2, 13, 14A, 14B and 14C, the respective irradiation windows 31b through 33b are disposed as along the straight lines extending radially from the center of the rotary shaft 3 in the radial direction and may also be disposed, without being limited to-this disposition along the straight lines, so as to be inclined at predetermined angles to the straight lines.

<Third Embodiment>

Figure 15:
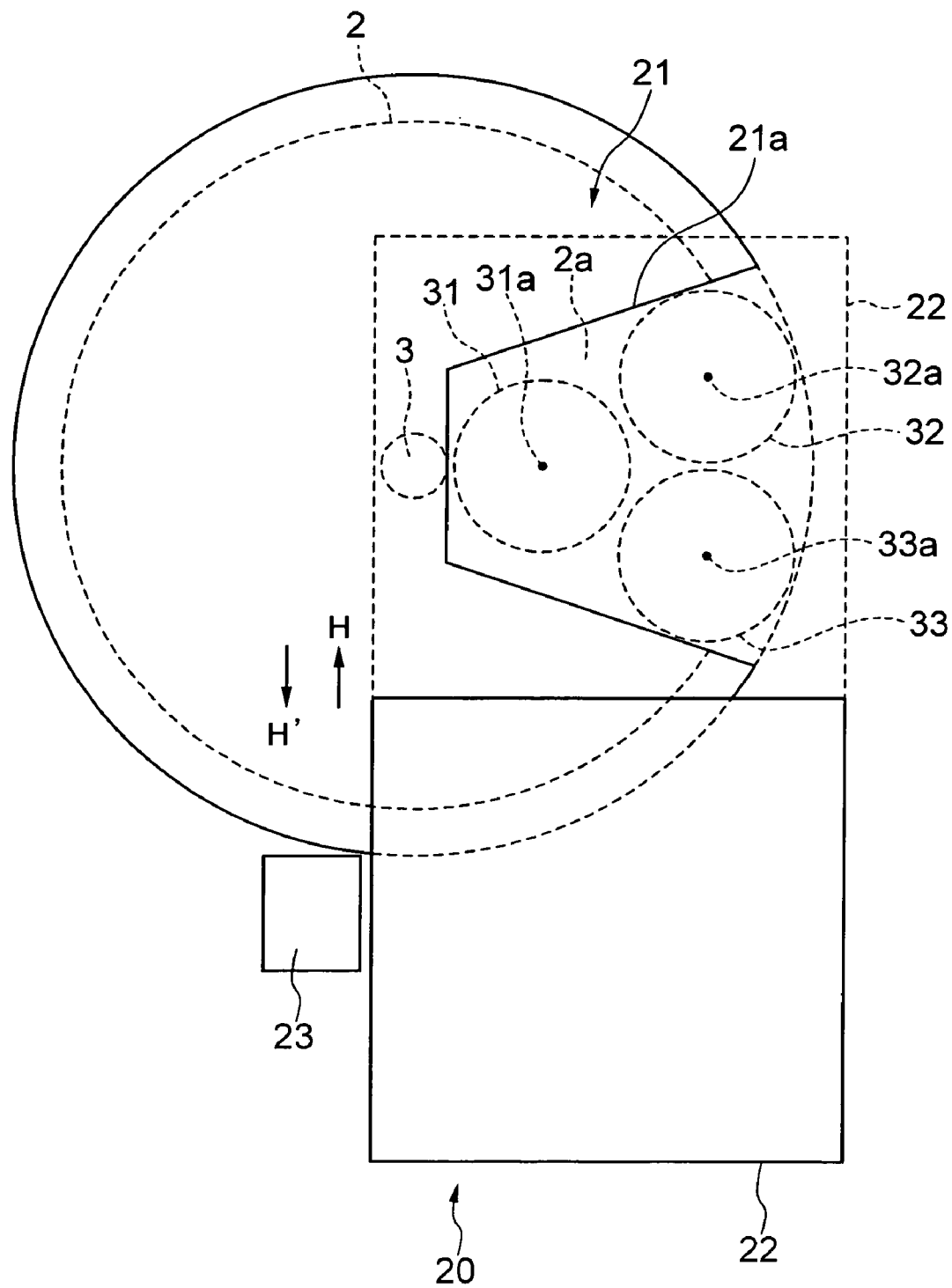
FIG. 15 is a plan view schematically showing a shutter member and a shutter driving mechanism of the electron beam irradiation apparatus in a third embodiment.

FIG. 15 is a plan view schematically showing the shutter member and the shutter driving mechanism of the electron beam irradiation apparatus according to a third embodiment.

The electron beam irradiation apparatus according to the third embodiment is constructed in the same way as in FIGS. 1, 2 and 3 except a different geometrical arrangement of the plurality of electron beam irradiation tubes, and hence explanations of the same components as those in FIGS. 1 through 3 are omitted.

As illustrated in FIG. 15, the electron beam irradiation unit 11 in FIG. 1 includes the cylindrical electron beam irradiation tubes 31, 32, 33 arranged in the radial direction of the object 2. The electron beam irradiation tube 31 is disposed on the inner peripheral side, while both of the electron beam irradiation tubes 32, 33 are disposed substantially in the same radial positions on the outer peripheral side.

Figure 16A:
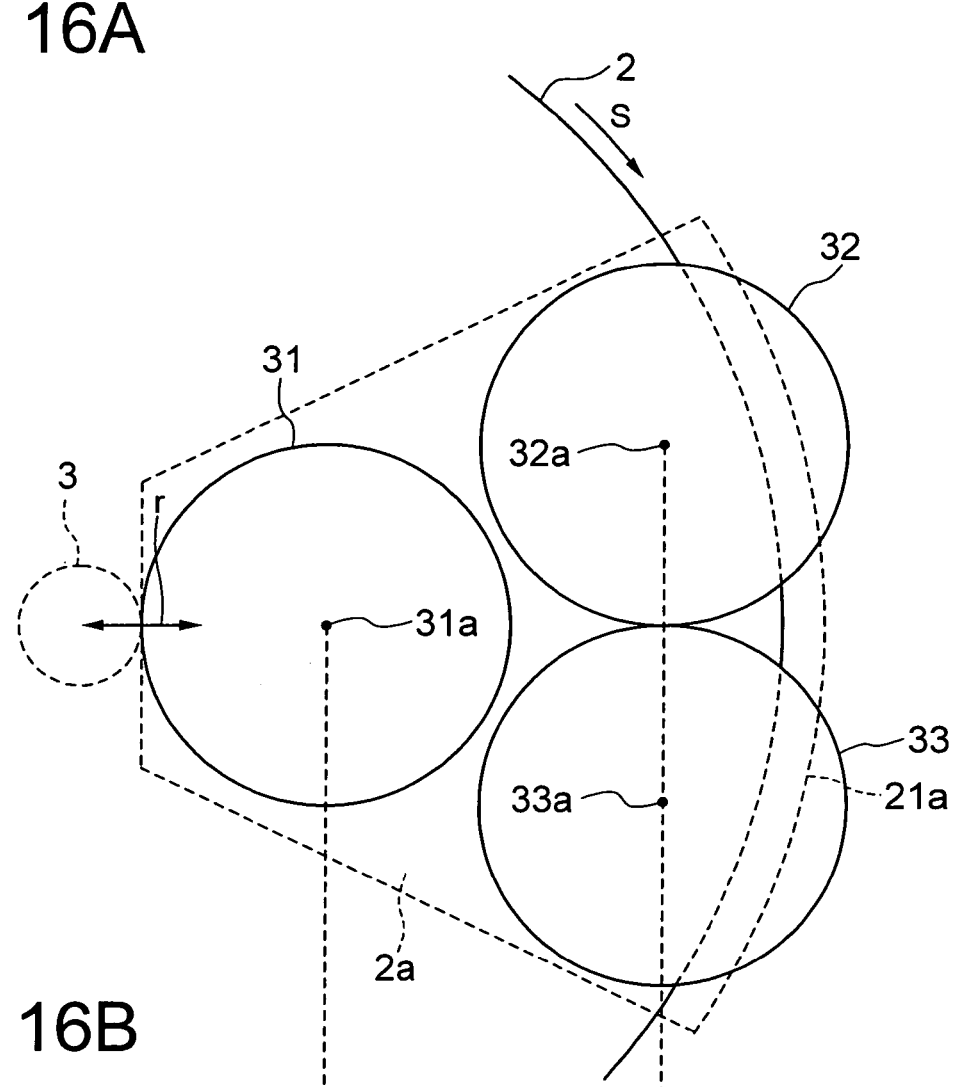
FIG. 16A is a partial plan view schematically showing a first example of a geometrical arrangement of the electron beam irradiation tubes with respect to the object in the electron beam irradiation apparatus in FIG. 15.
Figure 16B:
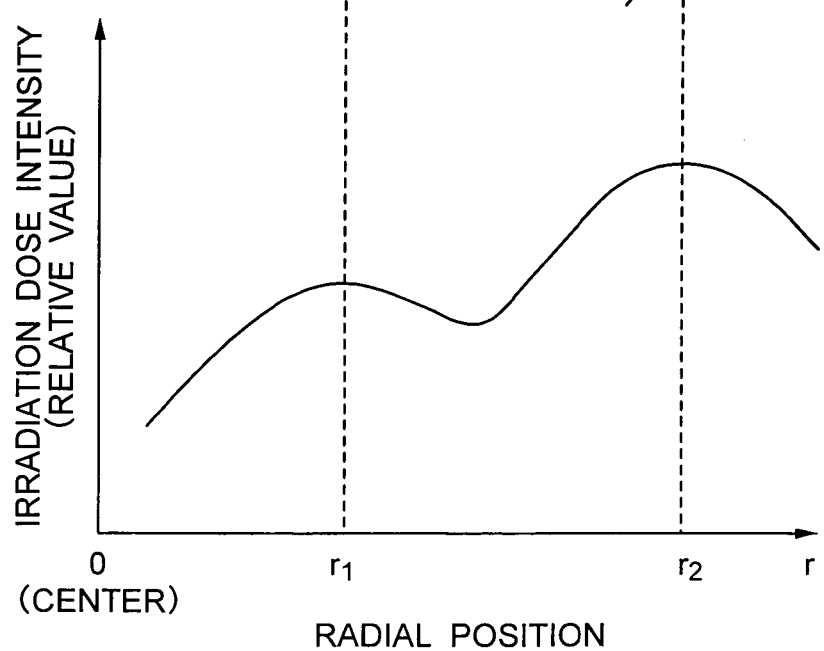
FIG. 16B is a distribution graph schematically showing an irradiation beam intensity distribution of the electron beams in the first example of the geometrical arrangement.

A specific example where the electron beam irradiation tubes 31, 32, 33 in FIG. 15 are disposed in the radial direction, will be explained with reference to FIGS. 16A and 16B. FIG. 16A is a partial plan view schematically showing a first example of the geometrical arrangement of the electron beam irradiation tubes with respect to the object in the electron beam irradiation apparatus in FIG. 15. FIG. 16B is a distribution graph schematically showing an irradiation beam intensity distribution of the electron beams in the first example of the geometrical arrangement.

As shown in FIG. 16A, the electron beam irradiation tubes 31, 32, 33 are so arranged as to be accommodated within the aperture 21a of the disc 21. The electron beam irradiation tubes 32, 33 are, however, arranged so that their central positions 32a, 33a are disposed substantially in the same radial positions (at the same distances in the radial direction from the center of the object 2) r2 on the outer peripheral side with respect to the object 2, while the electron beam irradiation tube 31 is arranged so that its central position 31a is disposed in a radial position r1 on the inner peripheral side with respect to the object 2.

As shown in FIG. 16A, when the electron beam irradiation tubes 31, 32, 33 are arranged, the irradiation beam intensities of the electron beams are distributed in directions of the radial positions r of the object 2 as shown in FIG. 16B. The distribution is such that the irradiation beam intensities of the electron beams are comparatively high on the outer peripheral side but comparatively low on the inner peripheral side.

Supposing that t sec is set as a period of time required for one rotation when the rotated body 1 is rotated at a fixed speed in a rotating direction S at the irradiation time of the electron beams in FIG. 16A, a peripheral speed v1 in a radial position r1 of the rotated body 2 and a peripheral speed v2 in a radial position r2 thereof can be expressed in the following formulae, respectively.

$$v1=(2\pi \cdot r1)/t \quad (1)$$

$$v2=(2\pi \cdot r2)/t \quad (2)$$

where r1<r2, and hence a relation between the peripheral speed v1 and the peripheral speed v2 is given in the following formula (3).

$$v1<v2 \quad (3)$$

As described above, in the object 2 rotated at the fixed rotating speed, the peripheral speed differs depending on the radial position r on the surface of the object 2 as shown in the formula (3), and therefore an integrated irradiation dose of the electron beam irradiation has an ununiform distribution, wherein the dose is large on the inner peripheral side but small on the outer peripheral side in the radial area 2a. When the electron beam irradiation tubes 31, 32, 33 are arranged as shown in FIG. 16A, however, the irradiation intensity of the electron beams becomes comparatively high on the outer peripheral side and comparatively low on the inner peripheral side as seen in FIG. 16B. It is therefore possible to correct and comparatively uniformize the ununiform distribution of the integrated irradiation dose of the electron beam irradiation in the radial direction.

Note that a moving speed when the shutter driving mechanism 20 opens and closes the shutter member 22 with the aid of the slider 23 is comparatively high and is by far higher than the rotating speed of the object, and hence there can be ignored a time difference of the irradiation that occurs when opening and closing the shutter member. Moreover, the positions of the respective electron beam irradiation tubes 31 through 33 in FIG. 16A may be adjusted to further uniformize the integrated irradiation dose of the electron beam irradiation.

The thus-constructed electron beam irradiation apparatus in FIGS. 15, 16A and 16B performs the irradiation of the electron beams in such a way that the control unit 30 controls the whole components as shown in FIG. 3, and can operate in the same way as done in the respective steps S01 through S11 explained in FIG. 4.

As explained above, according to the electron beam irradiation apparatus in the third embodiment, the surface of the on-rotating object 2 is irradiated with the electron beams, whereby the electron beams having the larger energy than the ultraviolet rays have can fall upon the surface of the object 2 at the high efficiency. Accordingly, the lubricating layer composed of the material that is hard to be cured by, e.g., the irradiation of the ultraviolet rays, can be easily cured.

Moreover, the surface of the object 2 is irradiated with the electron beams of which the acceleration voltage is 20 kV through 100 kV, whereby the electron beam energy can be highly efficiently applied across the surface of the object 2 over a thin range, e.g., over the lubricating layer, and deterioration of a substrate, etc. can be prevented without exerting influence of the electron beams upon the substrate, etc. existing thereunder.

Further, the control of the switchover to the irradiation and the non-irradiation of the electron beams can be easily executed by use of the shutter driving mechanism 20 and the shutter member 22.

Still further, the irradiation of the electron beams can be performed to attain substantially the uniform distribution of the integrated irradiation dose of the electron beam irradiation in the radial direction of the object 2, and the energy of the electron beams can be applied over the irradiated surface of the object 2 uniformly on the whole, and consequently, e.g., the resin layer can be uniformly efficiently cured.

Figure 17A:
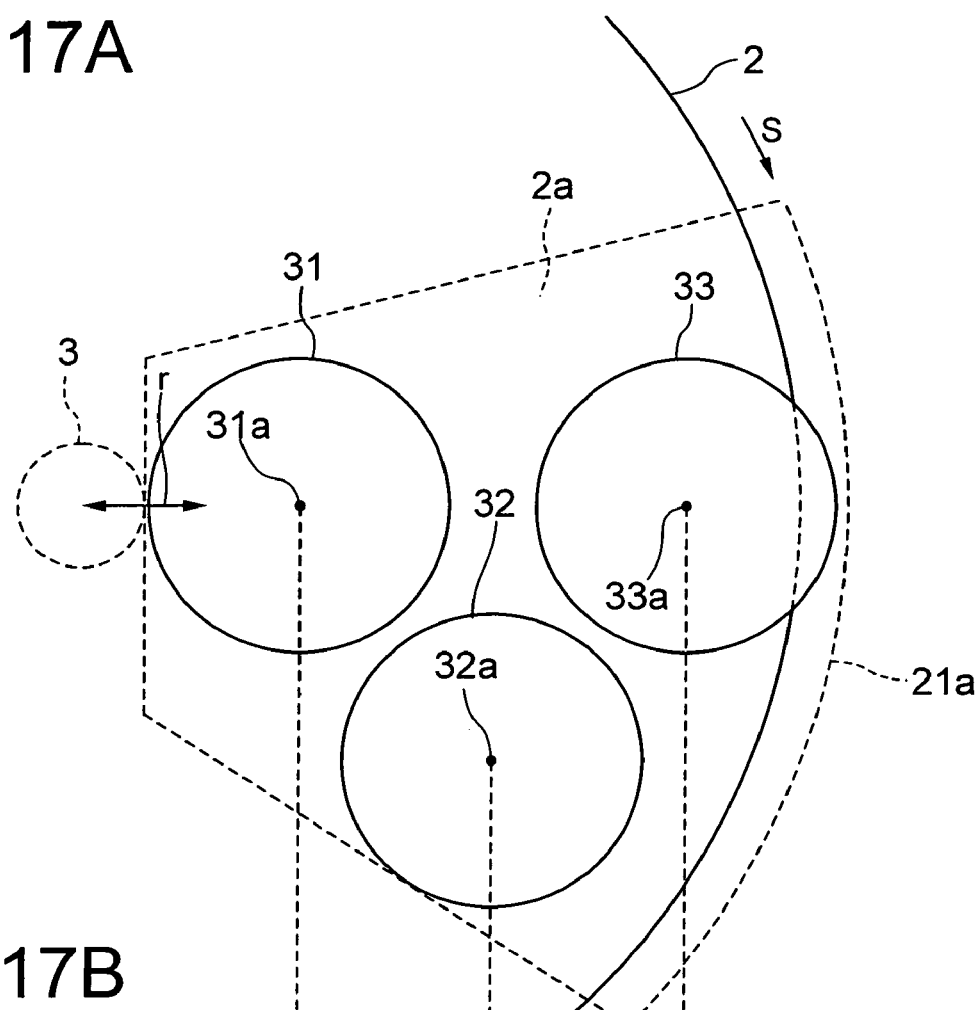
FIG. 17A is a partial plan view schematically showing a second example of the geometrical arrangement of electron beam irradiation tubes 31 through 33 with respect to an object 2 to be rotated in the electron beam irradiation apparatus in the third embodiment.
Figure 17B:
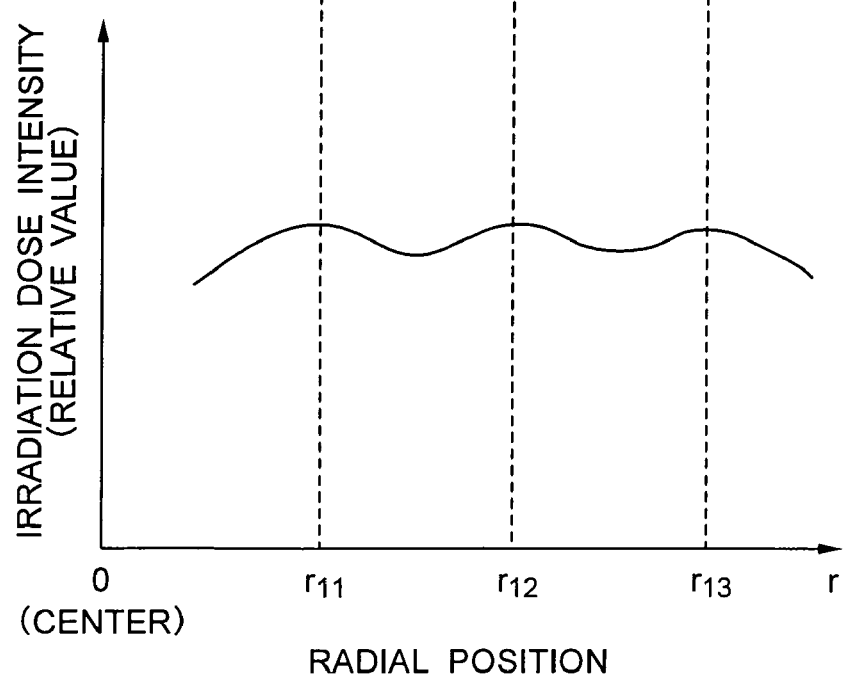
FIG. 17B is a distribution graph schematically showing an irradiation beam intensity distribution of the electron beams in the second example of the geometrical arrangement.

Next, a second example of the geometrical arrangement, in the radial direction, of the electron beam irradiation tubes 31, 32, 33 in FIG. 15, will be explained with reference to FIGS. 17A and 17B. FIG. 17A is a partial plan view schematically showing the second example of the geometrical arrangement of the electron beam irradiation tubes 31 through 33 with respect to the object 2 in the electron beam irradiation apparatus in the third embodiment. FIG. 17B is a distribution graph schematically showing an irradiation beam intensity distribution of the electron beams in the second example of the geometrical arrangement.

The electron beam irradiation tubes 31, 32, 33 are arranged as shown in FIG. 17A, wherein central positions 31a, 32a, 33a thereof are so disposed in radial positions r11, r12, r13 of the object 2 substantially at an equal interval in the radial direction of the object 2 as to be accommodated within the aperture 21a of the disc 21. Thus, when the electron beam irradiation tubes 31, 32, 33 are arranged, as shown in FIG. 17B, the irradiation beam intensity of the electron beams has substantially a uniform distribution in the direction of the radial position r of the object 2.

When the object 2 is rotated at the fixed speed at the irradiation time of the electron beams in FIG. 17A, let v11, v12, v13 be the peripheral speeds in the radial positions r11, r12, r13 of the object 2. Then, similarly to the relation in the formulae (1) through (3) given above, a positional relation is r11<f12<r13, and hence a relation between the peripheral speeds v11, v12, v13 is given as in the following formula (4).

$$v11<v12<v13 \quad (4)$$

As described above, in the object 2 rotated at the fixed rotating speed, the peripheral speed differs depending on the radial position r on the surface of the object as seen in the formula (4), and besides, as shown in FIG. 17B, the irradiation beam intensity exhibits substantially the uniform distribution in the radial positions. Therefore, the integrated irradiation dose of the irradiation doses in the radial area 2a of the object 2 becomes large on the inner peripheral side but small on the outer peripheral side. Such being the case, as shown in FIG. 18, the distribution of the integrated irradiation dose of the irradiation doses in the radial area 2a is so controlled as to be substantially uniformized by constructing the shutter member.

Figure 18:
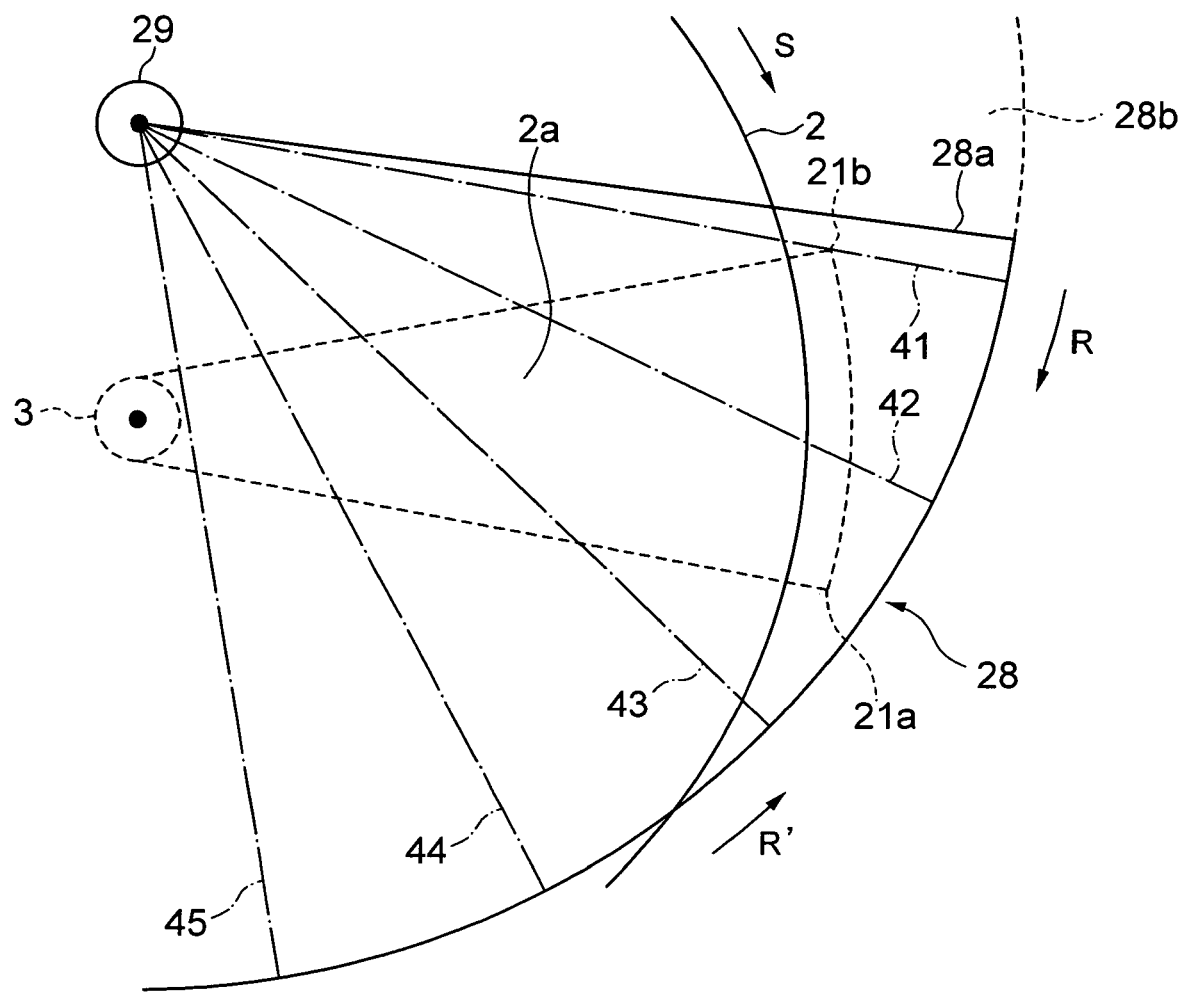
FIG. 18 is a partial plan view, similar to FIG. 17A, showing a modified example of the shutter member preferable as applied to a case of having the electron beam intensity distribution of the electron beams as shown in FIG. 17B.
Figure 20:
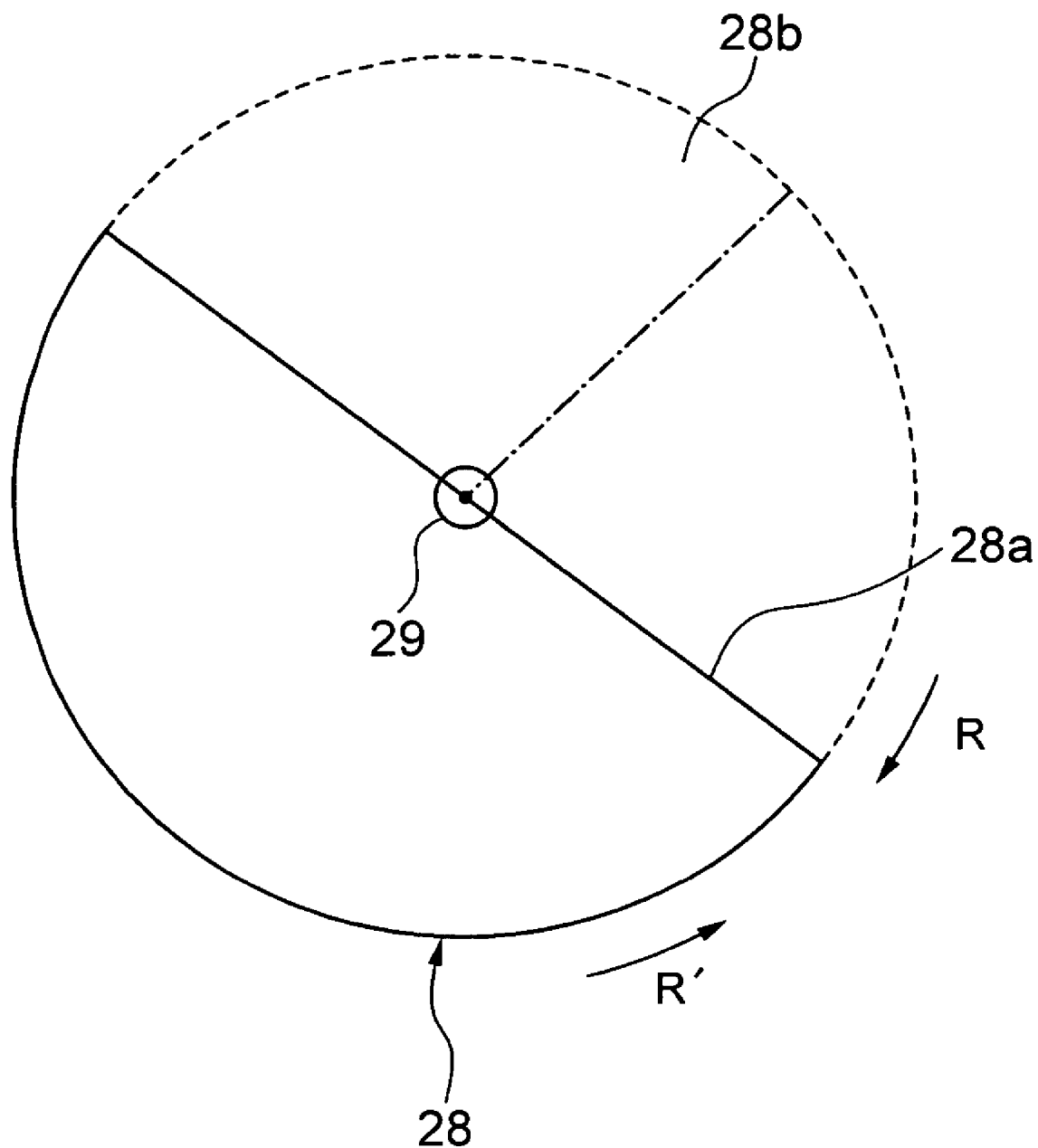
FIG. 20 is a plan view of the shutter member in FIG. 18.

FIG. 18 is a partial plan view, similar to FIG. 17A, showing a modified example of the shutter member. FIG. 20 is a plan view of the shutter member in FIG. 18. As illustrated in FIGS. 18 and 20, a shutter member 28 is so constructed in a disc shape as to be rotatable about the center of a rotary shaft 29 in an opening direction R and a closing direction R' opposite to the direction R. The shutter member 28 is substantially semi-circularly notched and therefore has a notched portion 28b formed as depicted by a broken line and an edge portion 28a formed rectilinearly. Note that the shutter member 28 may take substantially a three-quarter circular shape as indicated by a one-dotted line in FIG. 20, and the like.

The rotary shaft 29 of the shutter member 28 exists in a position eccentric to the rotational center (corresponding to the rotary shaft 3) of the object 2. Further, the shutter driving mechanism 20 includes a motor (unillustrated) capable of rotating in forward and reversed directions, and opens and closes the shutter member 28 in a way that moves the shutter member 28 by rotating the rotary shaft 29 in the opening direction R and in the closing direction R'.

An operation of the shutter member 28 by the shutter driving mechanism will be explained. To being with, the shutter member 28 shields the electron beams by covering the aperture 21a in the closing position depicted by the solid line in FIG. 18 and is thus in a non-irradiation state of the electron beams. From this state, when the shutter member 28 is rotated about the rotary shaft 29 in the opening direction R, the aperture 21a gradually opens from the edge portion 28a of the notched portion 28b.

To be specific, the shutter member 28 moves, and the edge portion 28a thereof reaches an outer peripheral edge 21b of the aperture 21a and passes through an edge-portion position 41 (of the edge portion 28a) indicated by the one-dotted line, thereby opening the aperture 21a from the vicinity of the outer peripheral edge 21b. Subsequently, the shutter member 28 opens the aperture 21a from the outer peripheral side toward the inner peripheral side while the edge portion 28a thereof moves stepwise to edge-portion positions 42, 43, 44 indicated by the one-dotted lines in FIG. 15. Then, the shutter member 28 opens the aperture 21a almost entirely in an edge-portion position 45.

A rotating speed of the shutter member 28 rotated as described above is set to the same degree as the rotating speed of the object 2 rotated in a rotating direction S when irradiated with the electron beams or set with almost no difference from that of the object 2. Accordingly, the irradiation dose of the electron beams emitted during a period for which the shutter member 28 is rotated and keeps the aperture 21a open, can not be ignored. As described above, however, since the aperture 21a is opened from the outer peripheral side toward the inner peripheral side, a period of irradiation time of the electron beams in the radial area 2a on the object 2 is comparatively long on the outer peripheral side and comparatively small on the inner peripheral side, and consequently it is possible to correct and comparatively uniformize the ununiform distribution of the aforementioned integrated irradiation dose of the electron beams in the radial direction.

Further, the shutter member 28 is, after a predetermined period of time has elapsed, rotated in the rotating direction R and in the opposite rotating direction R' as shown in FIG. 18 at the same rotating speed as the speed at the opening time, and then closes the aperture 21a while the edge portion 28a thereof moves stepwise to the edge-portion positions 45, 44, 43, 42, 41 in the reversed sequence to the sequence described above. At this time, the aperture 21a is closed initially from the inner peripheral side gradually toward the outer peripheral side, and hence the irradiation time of the electron beams in the radial area 2a on the object 2 is comparatively long on the outer peripheral side and comparatively short on the inner peripheral side. It is therefore feasible to further correct and further comparatively uniformize the ununiform distribution of the integrated irradiation dose of the electron beams in the radial direction.

Note that the distribution of the integrated irradiation dose of the electron beam irradiation in the radial direction can be more uniformized by properly adjusting the position of the rotary shaft 29 for the shutter member 28, the shape of the edge portion 28a, the shape of the aperture 21a and so on. Further, the positions of the respective electron beam tubes 31 through 33 in FIG. 17A may also be minutely adjusted to further uniformize the distribution of the integrated irradiation dose of the electron beam irradiation.

Figure 19A:
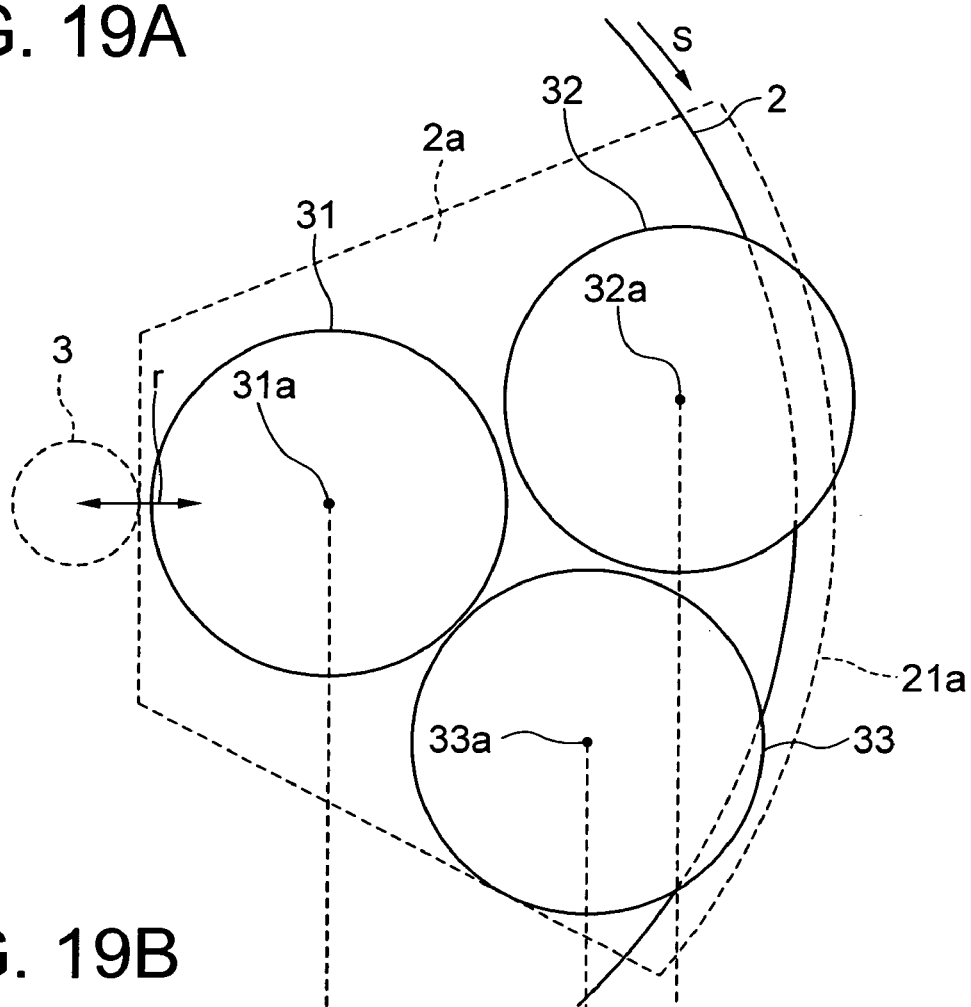
FIG. 19A is a partial plan view showing a modified example of the first example of the geometrical arrangement of electron beam irradiation tubes with respect to the object in the electron beam irradiation apparatus in the third embodiment.
Figure 19B:
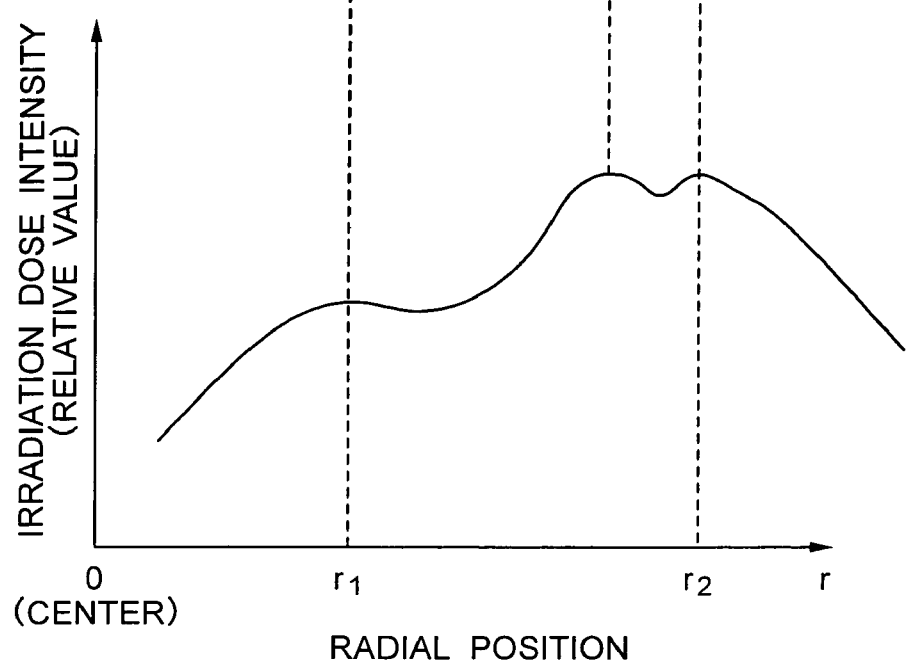
FIG. 19B is a distribution graph schematically showing an irradiation beam intensity distribution of the electron beams in the modified example thereof.

Moreover, FIG. 19A shows a different example of the geometrical arrangement of the electron beam irradiation tubes 31 through 33 in FIG. 16A. As shown in FIG. 19A, a radial position of the electron beam irradiation tube 33 in FIG. 16A is shifted closer to the inner peripheral side than the electron beam irradiation tube 32, whereby a distribution of the irradiation dose intensity of the electron beams may be plotted as in FIG. 19B.

Further, the third embodiment involves using three lengths of electron beam irradiation tubes, however, the number of electron beam irradiation tube(s) may be singular or two and may also be equal to or larger than 4, and a required distribution of the irradiation dose intensity of the electron beams can be obtained by adjusting the arrangement interval of the electron beam irradiation tubes in the radial direction.

Moreover, the electron beam irradiation apparatus according to the third embodiment can be, in the same way as the electron beam irradiation apparatus in FIG. 1 is, applied to the apparatus for manufacturing the disc-shaped medium in FIGS. 5 through 10. This disc-shaped medium manufacturing apparatus can executes the respective operations such as irradiating the disc-shaped medium with the electron beams in steps S21 through S26 and ejecting and supplying the disc-shaped medium in S30 through S40 as in FIG. 11 and can therefore acquire the same effects as those of the manufacturing apparatus 50 in FIGS. 5 through 9.

Moreover, the irradiation of the electron beams can be conducted to attain substantially the uniform distribution of the integrated irradiation dose of the electron beam irradiation in the radial direction of the object 2, and the energy of the electron beams can be uniformly applied over the entire irradiated surface of the object 2, whereby the lubricating layer can be uniformly efficiently cured.

Further, the switchover control of the irradiation and the non-irradiation of the electron beams can be easily executed by using the shutter driving mechanism 20 and the shutter member 22 in FIG. 15, and there is no necessity of ON/OFF-controlling the power source 12 of the electron beam irradiation unit 11. Hence, the startup time of the electron beam irradiation unit 11 gets unnecessary, the disc-shaped mediums 49 are supplied one after another to the electron beam irradiation apparatus, and the repetitive irradiation of the electron beams can be consecutively executed at the high efficiency, thereby improving the productivity.

It should be noted that throughout the present specification, the term [rotational] implies not a simple consecutive rotation of the object in one direction (or in the direction opposite thereto) as in the rotation but a turn in a way that changes its position so as to turn by a predetermined amount in one direction or in the opposite direction and then stop. Further, the term [radial direction] of the object connotes the directions extending radially from the rotational center of the object, and the directions extending to the outer periphery of the object from points eccentric from the rotational center of the object.

As discussed above, the present invention has been described by way of the embodiments but is not limited to those embodiments, and a variety of modifications can be made within the-range of the technical ideas of the present invention. For example, in the apparatus for manufacturing the disc-shaped medium according to the present embodiment, the exemplification is that the light transmitting layer and the lubricating layer that are composed of the aforementioned materials are formed by curing in the vicinity of the surface of the disc-shaped medium such as an optical disc, etc., however, the present invention is not limited to this construction and may also be, as a matter of course, applied to the curing of a resin layer, etc. other than the lubricating layer. For instance, the present invention may be applied to forming, in FIG. 12, only the light transmitting layer 92 under the lubricating layer 93, wherein the layer can be instantaneously cured. This is efficient and can contribute to the improvement of the productivity.

Moreover, a variety of disc shapes may be taken for the object that can be irradiated with the electron beams by the electron beam irradiation apparatus. Further, the disc-shaped medium such as the optical disc, etc. has been exemplified as the disc-shaped object that can be manufactured by the manufacturing apparatus 50, however, the present invention can be, as a matter of course, applied to a case of forming a variety of resin layers on the disc-shaped object other than the medium.

Still further, in the electron beam irradiation apparatus in FIG. 1 and in the manufacturing apparatus in FIGS. 5 through 9, it is preferable that the tube voltage, etc. of the electron beam irradiation tube of the electron beam irradiation unit 11 is determined in consideration of the layer thickness on the surface defined as the target irradiated with the electron beams. Yet further, the number of electron beam irradiation tubes configuring the electron beam irradiation unit 11 can be properly increased or decreased corresponding to a size and an area of the irradiation target surface.

Furthermore, the gas to be replaced with the atmospheres within the chamber and within the electron beam irradiation apparatus is not limited to the nitrogen gas, wherein an inert gas such as an argon gas, a helium gas, etc. is available, and a mixture gas of these two or more types of gases is also available.

INDUSTRAIL APPLICABILITY

According to the present invention, it is possible to provide the electron beam irradiation apparatus and the electron beam irradiation method that are capable of efficiently irradiating the object such as the disc-shaped object and the like with the electron beams, and of easily curing the material which is hard to be cured by the irradiation of the ultraviolet rays.

Moreover, it is feasible to provide the disc-shaped object manufacturing apparatus and the disc-shaped object manufacturing method that are capable of efficiently forming, on the disc-shaped object, the lubricating layer/resin layer, etc composed of the material that is hard to be cured by the irradiation of the ultraviolet rays.

According to the present invention, it is possible to provide electron beam irradiation apparatus and the electron beam irradiation method that are capable of efficiently irradiating the object such as the disc-shaped object, etc. with the electron beams, easily curing the material that is hard to be cured by the irradiation of, e.g., the ultraviolet rays and easily executing the switchover to the irradiation and the non-irradiation of the electron beams.

The invention claimed is:

1. An electron beam irradiation apparatus comprising:
 a rotary driving unit for rotationally driving an object to be rotated;
 a shield container for rotatably accommodating the object and an interior of said shield container is set in an atmosphere of an inert gas; and
 an electron beam irradiation unit provided in said shield container so that the surface of the object is irradiated with electron beams from an irradiation window thereof,
 wherein the surface of the object is irradiated with the electron beams during its rotation from said irradiation window of said electron beam irradiation units,
 wherein said shield container is provided with a gas introduction port and a gas discharge port from which the inert gas flows in the vicinity of said irradiation window,
 wherein a temperature sensor is provided in the vicinity of said irradiation window, and
 wherein a flow rate of the inert gas is adjusted based on a temperature measured by said temperature sensor.

2. An electron beam irradiation apparatus according to claim 1, wherein said electron beam irradiation unit emits the electron beams under a low acceleration voltage.

3. An electron beam irradiation apparatus according to claim 1, wherein the acceleration voltage of said electron beam irradiation unit is 20 kV through 100 kV.

4. An electron beam irradiation apparatus according to claim 1, wherein an oxygen concentration meter for measuring an oxygen concentration within said shield container is provided.

5. An electron beam irradiation apparatus according to claim 1, wherein a vacuumizing device for depressurizing the interior of said shield container is provided.

6. An electron beam irradiation apparatus according to claim 1, wherein the object has a disc shape, and
 an area extending in at least one radial direction of the surface of the object is irradiated with the electron beams.

7. An electron beam irradiation apparatus compnsing:
 a rotary driving unit for rotationally driving an object to be rotated wherein the object has a disc shape;
 a shield container for rotatably accommodating the object; and
 an electron beam irradiation unit provided in said shield container so that the surface of the object is irradiated with electron beams from an irradiation window thereof,
 wherein the surface of the object is irradiated with the electron beams during its rotation from said irradiation window of said electron beam irradiation unit,
 wherein said electron beam irradiation unit includes a plurality of electron beam irradiation tubes, and
 wherein each of said electron beam irradiation tubes irradiates each of a plurality of areas on the surface with the electron beams.

8. An electron beam irradiation apparatus comprising:
 a rotary driving unit for rotationally driving an object to be rotated;
 a shield container for rotatably accommodating the object;
 an electron beam irradiation unit provided in said shield container so that the surface of the object is irradiated with electron beams from an irradiation window thereof; and
 a shutter member is disposed between said irradiation window and the surface of the object,
 wherein the surface of the object is irradiated with the electron beams during its rotation from said irradiation window of said electron beam irradiation unit, and wherein a shutter driving mechanism moves said shutter member between an opening position of permitting transmission of the electron beams emitted from said irradiation window and a closing position of blocking the electron beams, thus controlling switchover of the irradiation and non-irradiation of the electron beams upon the surface of the object.

9. An electron beam irradiation apparatus according to claim 8, wherein the switchover is conducted so that a quantity of emission of the electron beams is set large when said shutter member is in the opening position and set small when said shutter member is in the closing position.

10. An electron beam irradiation apparatus comprising:
a rotary driving unit for rotationally driving an object to be rotated;
a shield container for rotatably accommodating the object; and
an electron beam irradiation unit provided in said shield container so that the surface of the object is irradiated with electron beams from an irradiation window thereof,
wherein the surface of the object is irradiated with the electron beams during its rotation from said irradiation window of said electron beam irradiation unit, and
wherein said shield container is openable and closable and is composed of a metallic material, and has a shielding structure for shielding the electron beams emitted from said irradiation window.

11. An electron beam irradiation method comprising the steps of:
rotationally driving an object to be rotated accommodated in a shield container that can be air-tightly closed;
irradiating the surface of said on-rotating object with the electron beams from an irradiation window of an electron beam irradiation unit;
depressurizing an interior of said shield container and thereafter replacing in the interior an inert gas atmosphere by introducing an inert gas;
flowing the inert gas through the vicinity of said irradiation window toward a gas discharge port from a gas introduction port, thereby cooling off the vicinity of said irradiation window; and
adjusting a flow rate of the inert gas based on a temperature measured by a temperature sensor provided in the vicinity of said irradiation window, thereby controlling a cooling temperature.

12. An electron beam irradiation method according to claim 11, wherein said electron beams irradiation unit emits the electron beams of which an acceleration voltage is 20 kV through 100 kV.

13. An electron beam irradiation method according to claim 11, further comprising the step of controlling a flow rate of the inert gas while measuring an oxygen concentration within said shield container.

14. An electron beam irradiation method according to claim 11, wherein the object has a disc shape, and further comprising the step of irradiating on the surface an area, extending in at least one radial direction, on the surface with the electron beams.

15. An electron beam irradiation method comprising the steps of:
rotationally driving an object to be rotated accommodated in a shield container that can be air-tightly closed;
irradiating the surface of said on-rotating object with the electron beams from an irradiation window of an electron beam irradiation unit; and
irradiating each of a plurality of areas with the electron beams with a plurality of electron beam irradiation tubes of said electron beam irradiation unit
wherein the object has the disc shape.

16. An electron beam irradiation method comprising the step steps of:
rotationally driving an object to be rotated accommodated in a shield container that can be air-tightly closed;
radiating the surface of said on-rotating object with the electron beams from an irradiation window of an electron beam irradiation unit; and
moving a shutter member disposed between said irradiation window and the surface of the object between an opening position of permitting transmission of the electron beams emitted from said irradiation window and a closing position of blocking the electron beams, thus controlling switchover of the irradiation and non-irradiation of the electron beams upon the surface of the object.

17. An electron beam irradiation method according to claim 16, wherein the switchover is conducted so that a quantity of emission of the electron beams is set large when said shutter member is in the opening position and set small when said shutter member is in the closing position.

18. An electron beam irradiation apparatus comprising:
a rotary driving unit for rotationally driving an object to be rotated;
a shield container for rotatably accommodating the object;
an electron beam irradiation unit provided in said shield container so that the surface of the object is irradiated with electron beams from an irradiation window thereof;
a shutter member disposed between said irradiation window and the surface of the object and movable between an opening position of permitting transmission of the electron beams emitted from said irradiation window and a closing position of blocking the electron beams; and
a shutter driving mechanism for moving said shutter member so as to effect switchover to the irradiation and non-irradiation of the electron beams during a rotation of the object,
wherein the object has a disc shape, and an area, extending in a radial direction, on the surface is irradiated with the electron beams from said irradiation window.

19. An electron beam irradiation apparatus according to claim 18, wherein said electron beam irradiation unit includes a plurality of electron beam irradiation tubes disposed in the radial direction on the surface.

20. An electron beam irradiation apparatus according to claim 19, wherein said plurality of electron beam irradiation tubes are so arranged as to substantially uniformize a distribution of irradiation beam intensities of the electron beams in the radial direction.

21. An electron beam irradiation apparatus according to claim 20, wherein a period of electron beam irradiation time is controlled corresponding to a radial position of the object so as to substantially equalize an integrated irradiation dose of the electron beam irradiation in the radial direction.

22. An electron beam irradiation apparatus according to claim 20, wherein said shutter member is constructed to start, when opened, opening in an outer peripheral position and to gradually open toward an inner peripheral position on the surface of the object.

23. An electron beam irradiation apparatus according to claim 20, wherein an aperture is formed extending in the radial direction, the switchover to the irradiation and the non-irradiation of the electron beams is performed by opening and closing said aperture through a movement of said shutter member, and the electron beam irradiation time is controlled corresponding to the radial position of the object, depending on a relative position between said shutter member and said aperture and on a moving speed of said shutter member.

24. An electron beam irradiation apparatus according to claim 19, wherein said plurality of electron beam irradiation tubes are arranged to obtain such a distribution that an irradiation beam intensity of the electron beams is high on the outer peripheral side but low on the inner peripheral side in the radial direction.

25. An electron beam irradiation apparatus according to claim 24, wherein said shutter member is constructed to open and close at a comparatively higher speed than a rotating speed of the object.

26. An electron beam irradiation apparatus according to claim 25, wherein an aperture is formed extending in the radial direction, and the switchover to the irradiation and the non-irradiation of the electron beams is performed by opening and closing said aperture through a movement of said shutter member.

27. An electron beam irradiation method comprising the steps of:

rotationally driving an object to be rotated accommodated in a shield container that can be air-tightly closed;

irradiating the surface of said on-rotating object with the electron beams from an irradiation window by moving a shutter member provided between the surface of the object and said irradiation window of an electron beam irradiation unit; and stopping the irradiation of the electron beams by blocking the electron beams in a way that moves said shutter member after the irradiation of the electron beams for a predetermined period of time.

28. An electron beam irradiation method according to claim 27, wherein said electron beams irradiation unit has an acceleration voltage ranging from 20 kV to 100 kV.

29. An electron beam irradiation method according to claim 27, further comprising the steps of depressurizing an interior of said shield container and thereafter replacing in the interior an inert gas atmosphere by introducing an inert gas.

30. An electron beam irradiation method according to claim 29, further comprising the step of flowing the inert gas through the vicinity of said irradiation window toward a gas discharge port from a gas introduction port, thereby cooling off the vicinity of said irradiation window.

31. An electron beam irradiation method according to claim 27, wherein the object has a disc shape, and further comprising the step of irradiating with the electron beams from said irradiation window an area, extending in a radial direction, on the surface.

32. An electron beam irradiation method according to claim 31, wherein the irradiation of the electron beams is effected by a plurality of electron beam irradiation tubes, serving as said electron beam irradiation unit, arranged in the radial direction of the surface.

33. An electron beam irradiation method according to claim 32, further comprising the steps of arranging said plurality of electron beam irradiation tubes to substantially uniformize a distribution of irradiation beam intensities of the electron beams in the radial direction, and controlling a period of electron beam irradiation time corresponding to a radial position of the object so as to substantially uniformize a distribution of an integrated irradiation dose of the electron beam irradiation in the radial direction.

34. An electron beam irradiation method according to claim 33, wherein said shutter member starts opening in an outer peripheral position and gradually opens toward an inner peripheral position on the surface of the object, thereby controlling the electron beam irradiation time.

35. An electron beam irradiation method according to claim 32, further comprising the step of arranging said plurality of electron beam irradiation tubes to obtain such a distribution that an irradiation beam intensity of the electron beams is high on the outer peripheral side but low on the inner peripheral side in the radial direction.

36. An electron beam irradiation method according to claim 35, further comprising the steps of opening and closing said shutter member at a comparatively higher speed than a rotating speed of the object.

* * * * *

UNITED STATES PATENT AND TRADEMARK OFFICE
CERTIFICATE OF CORRECTION

PATENT NO. : 7,193,956 B2
APPLICATION NO. : 10/528518
DATED : March 20, 2007
INVENTOR(S) : Mamoru Usami et al.

It is certified that error appears in the above-identified patent and that said Letters Patent is hereby corrected as shown below:

IN THE CLAIMS:
Please add the following new claims:
Claim 37: An apparatus for manufacturing a disc-shaped object, comprising an electron beam irradiation apparatus according to claim 1,
wherein at least one of a resin layer and a surface layer formed on the object serving as a disc-shaped object is cured by the irradiation of the electron beams.

Claim 38: A method of manufacturing a disc-shaped object, involving the use of an electron beam irradiation method according to claim 11 further comprising the steps of:
forming at least one of a resin layer and a surface layer on the object serving as a disc-shaped object; and
curing the layer by the irradiation of the electron beams.

Claim 39: An electron beam irradiation method according to claim 11, wherein an aperture is formed extending in the radial direction, and
Wherein the switchover to the irradiation and the non-irradiation of the electron beams is performed by opening and closing said aperture through a movement of said shutter member.

Claim 40: An electron beam irradiation apparatus according to claim 18, wherein an aperture is formed extending in the radial direction, and
the switchover to the irradiation and the non-irradiation of the electron beams is performed by opening and closing said aperture through a movement of said shutter member.

Claim 41: An apparatus for manufacturing a disc-shaped object, comprising an electron beam irradiation apparatus according to claim 18,
wherein at least one of a resin layer and a surface layer formed on the object serving as a disc-shaped object is cured by the irradiation of the electron beams.

UNITED STATES PATENT AND TRADEMARK OFFICE
CERTIFICATE OF CORRECTION

PATENT NO. : 7,193,956 B2
APPLICATION NO. : 10/528518
DATED : March 20, 2007
INVENTOR(S) : Mamoru Usami et al.

It is certified that error appears in the above-identified patent and that said Letters Patent is hereby corrected as shown below:

IN THE CLAIMS: (cont'd)
    Please add the following new claims: (cont'd)
Claim 42: A method of manufacturing a disc-shaped object, involving the use an electron beam irradiation method according to claim 27, further comprising the steps of:
    forming at least one of a resin layer and a surface layer on the object serving as a disc-shaped object; and
    curing by the irradiation of the electron beams.

Signed and Sealed this

Thirtieth Day of October, 2007

JON W. DUDAS
*Director of the United States Patent and Trademark Office*